United States Patent [19]

Chang

[11] Patent Number: 4,918,642

[45] Date of Patent: Apr. 17, 1990

[54] ISOLATED CARRY PROPAGATION FAST ADDER

[76] Inventor: Chih C. Chang, 2017 B Jason Dr., Huntingdon Valley, Pa. 19006

[21] Appl. No.: 174,986

[22] Filed: Mar. 29, 1988

[51] Int. Cl.$^4$ .............................................. G06F 7/50
[52] U.S. Cl. .................................................. 364/787
[58] Field of Search ........................ 364/786, 787, 784

[56] References Cited

U.S. PATENT DOCUMENTS

| | | | |
|---|---|---|---|
| 3,728,532 | 4/1973 | Pryor | 364/787 |
| 3,906,211 | 9/1975 | Glaser | 364/786 |
| 4,789,958 | 12/1988 | Maejima et al. | 364/787 |
| 4,817,031 | 3/1989 | Tokumaru | 364/787 |
| 4,827,444 | 5/1989 | Akiyama et al. | 364/787 |

FOREIGN PATENT DOCUMENTS 59-5349  1/1984  Japan .................................. 364/787

*Primary Examiner*—David L. Clark
*Assistant Examiner*—Dale M. Shaw
*Attorney, Agent, or Firm*—William H. Murray

[57] ABSTRACT

An apparatus for adding two binary numbers in which the computation of the sum and the carry propagation are performed in separate parts. The carry propagation passes through switches in a switch network which is controlled by a switch control. The independence of the carry propagation, switch control, carry creation and the computation makes the carry propagation faster than prior art adders without increasing the number of logic gates. The adder can be made in the form of an m bit integrated circuit which can be used as a building block to construct an adder for the addition of a larger number of bits.

6 Claims, 17 Drawing Sheets

|    | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ |
|---|---|---|---|---|---|---|---|---|---|---|---|---|---|---|---|---|
| $C_{15}$ |   |   |   |   |   |   |   |   |   |   |   |   |   |   |   | 1 |
| $C_{14}$ |   |   |   |   |   |   |   |   |   |   |   |   |   |   | 1 | 2 |
| $C_{13}$ |   |   |   |   |   |   |   |   |   |   |   |   |   | 1 | 2 | 3 |
| $C_{12}$ |   |   |   |   |   |   |   |   |   |   |   |   | 1 | 2 | 3 | 4 |
| $C_{11}$ |   |   |   |   |   |   |   |   |   |   |   | 1 | 2 | 3 | 1 | 2 |
| $C_{10}$ |   |   |   |   |   |   |   |   |   |   | 1 | 2 | 3 | 4 | 2 | 3 |
| $C_9$ |   |   |   |   |   |   |   |   |   | 1 | 1 | 2 | 1 | 2 | 1 | 2 |
| $C_8$ |   |   |   |   |   |   |   |   | 1 | 2 | 2 | 3 | 2 | 3 | 2 | 3 |
| $C_7$ |   |   |   |   |   |   |   | 1 | 2 | 3 | 3 | 4 | 3 | 4 | 3 | 4 |
| $C_6$ |   |   |   |   |   |   | 1 | 2 | 1 | 2 | 2 | 3 | 2 | 3 | 2 | 3 |
| $C_5$ |   |   |   |   |   | 1 | 1 | 2 | 2 | 3 | 3 | 4 | 3 | 4 | 3 | 4 |
| $C_4$ |   |   |   |   | 1 | 2 | 2 | 3 | 1 | 2 | 2 | 3 | 2 | 3 | 2 | 3 |
| $C_3$ |   |   |   | 1 | 2 | 3 | 3 | 4 | 2 | 3 | 3 | 4 | 3 | 4 | 3 | 4 |
| $C_2$ |   |   | 1 | 2 | 1 | 2 | 3 | 4 | 1 | 2 | 2 | 3 | 2 | 3 | 2 | 3 |
| $C_1$ |   | 1 | 2 | 3 | 2 | 3 | 3 | 4 | 2 | 3 | 3 | 4 | 3 | 4 | 3 | 4 |

FIG. 20

| | $C_1$ | $C_2$ | $C_3$ | $C_4$ | $C_5$ | $C_6$ | $C_7$ | $C_8$ | $C_9$ | $C_{10}$ | $C_{11}$ | $C_{12}$ | $C_{13}$ | $C_{14}$ | $C_{15}$ | $C_{16}$ |
|---|---|---|---|---|---|---|---|---|---|---|---|---|---|---|---|---|
| $C_{15}$ | | | | | | | | | | | | | | | | 1 |
| $C_{14}$ | | | | | | | | | | | | | | | 1 | 2 |
| $C_{13}$ | | | | | | | | | | | | | | 1 | 1 | 1 |
| $C_{12}$ | | | | | | | | | | | | | 1 | 2 | 2 | 2 |
| $C_{11}$ | | | | | | | | | | | | 1 | 1 | 2 | 2 | 2 |
| $C_{10}$ | | | | | | | | | | | 1 | 2 | 1 | 2 | 2 | 2 |
| $C_9$ | | | | | | | | | | 1 | 1 | 1 | 1 | 1 | 1 | 1 |
| $C_8$ | | | | | | | | | 1 | 2 | 2 | 2 | 2 | 2 | 2 | 2 |
| $C_7$ | | | | | | | | 1 | 1 | 2 | 2 | 2 | 2 | 2 | 2 | 2 |
| $C_6$ | | | | | | | 1 | 2 | 1 | 2 | 2 | 2 | 2 | 2 | 2 | 2 |
| $C_5$ | | | | | | 1 | 1 | 1 | 1 | 2 | 2 | 2 | 2 | 2 | 2 | 2 |
| $C_4$ | | | | | 1 | 2 | 2 | 2 | 1 | 2 | 2 | 2 | 2 | 2 | 2 | 2 |
| $C_3$ | | | | 1 | 1 | 2 | 2 | 2 | 1 | 2 | 2 | 2 | 2 | 2 | 2 | 2 |
| $C_2$ | | | 1 | 1 | 1 | 2 | 2 | 2 | 1 | 2 | 2 | 2 | 2 | 2 | 2 | 2 |
| $C_1$ | | 1 | 2 | 2 | 1 | 2 | 2 | 2 | 1 | 2 | 2 | 2 | 2 | 2 | 2 | 2 |

FIG. 22

ISOLATED CARRY PROPAGATION FAST ADDER

BACKGROUND OF THE INVENTION

This invention relates to a method and apparatus for performing arithmetic operations on binary digital numbers and more particularly to a method and apparatus for adding two binary digital numbers.

The current typical fast adder is the look ahead adder. Since the total number of logic gates of a look ahead adder is proportional to a quadratic function of n, the number of bits of the addends, the total number of logic gates of a look ahead adder will be very high when n is large. To limit the total number of logic gates, the typical look ahead adder-integrated-circuit has 4 bits. For the computation of binary numbers with more bits, 4 bit look ahead adder integrated circuits are typically connected in cascade. For example, a 64 bit adder is constructed by connecting 16 4-bit look ahead adder integrated circuits in parallel and has two more levels of carry propagation circuit. In other words, such an adder looks just 4 bits ahead.

Furthermore, the look ahead adder provides a particular propagation path for each carry which is generated by each pair of bits of the addends. For example, a 4 bit look ahead adder has 4 independent carry propagation paths. At most one of these 4 paths will be used to propagate a carry. Therefore, any two of these 4 independent paths cannot be electrically connected together. Otherwise, a digital value 1 and a digital value zero may exist on the same node which is an electrical disaster. Hence the output of the carry of the 4 bit look ahead adder must be selected from these 4 independent paths. Because of the requirement for an independent carry propagation path for each bit and the selection of the carries from these independent paths, the look ahead adder requires more gates and more time delay than the Isolated Carry Propagation Fast Adder of the present invention as will be subsequently explained. The adder of the present invention can create the necessary carry propagation paths, which depend only upon the binary digital value of the addends, without an electrical disaster. In other words, the carry propagation paths of look ahead adder are preconstructed in the hardware for each kind of carry, while the carry propagation paths of the present invention are constructed by electrically connecting and isolating the carry nodes according to the binary digital value of the addends. The meaning of the words "Isolated Carry Propagation" will be explained in detail later.

SUMMARY OF THE INVENTION

It is therefore an object of the present invention to provide an apparatus and method for performing arithmetic operations on binary numbers which operates at higher speeds than the prior art apparatus and method.

It is another object of the present invention to provide an apparatus and method for performing arithmetic operations on binary numbers which requires fewer logic gates than the apparatuses and methods of the prior art.

These and other objects of the present invention are obtained by providing an adder in which the computation of the sum and the carry propagation are performed in separate parts. The carry propagation does not pass through any gates but passes through switches only. The independence of the carry propagation, switch control, carry creation, and the computation makes the carry propagation of the present invention faster without the cost of increasing of the number of logic gates. With about 25% less number of logic gates, the speed of the adder of the present invention is at least 60% faster than the typical look ahead adder for 16 bits; and has approximately twice the speed of the typical look ahead adder for 64 bits. The adder of the present invention also can be made in the form of an m-bit integrated circuit which can be used as a building block to construct an adder for the addition of a large number of bits, as in the typical prior art look ahead adder, but with higher speed and having a smaller size.

Other objects, features and advantages of the present invention will be more fully apparent from the following detailed description of the preferred embodiment, the appended claims and the accompanying drawing.

BRIEF DESCRIPTION OF THE DRAWING

FIG. 14 depicts an example of a P model for $n = 8$.

FIG. 15 depicts the completion of the algorithm shown in FIG. 13 corresponding to the P model shown in FIG. 14.

FIG. 20 depicts the completion of the algorithm shown in FIG. 13 corresponding to the T-R Model in FIG. 17.

FIG. 22 depicts the completion of the algorithm shown in FIG. 13 corresponding to the T-R Model shown in FIG. 21.

DETAILED DESCRIPTION OF THE INVENTION

Figure 1:
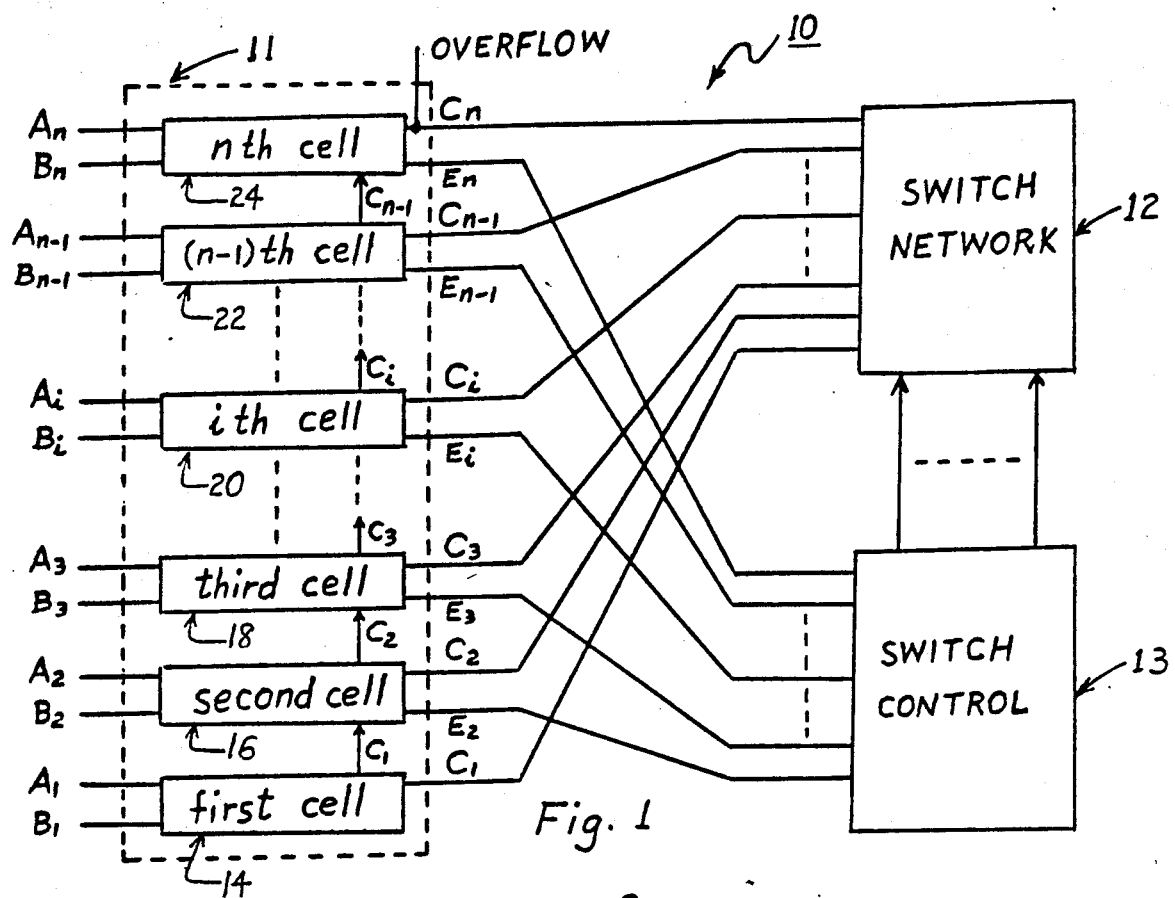
FIG. 1 is a block diagram of a preferred embodiment of a binary adder in accordance with the present invention.

Referring now to FIG. 1 there is shown a block diagram of a preferred embodiment of the adder of the present invention generally designated 10. The adder 10 comprises an adder base 11, a switch network 12 and a switch control 13. The adder base 11 comprises n cells where n equals the number of binary bits in each of the addends A and B. In the following detailed description, the least significant bit of the addends A and B are denoted by $A_1$ and $B_1$ respectively. The ith bits of A and B are denoted as $A_i$ and $B_i$ respectively; and the nth bits of A and B are denoted by $A_n$ and $B_n$ respectively. For n bit addends, there will be n cells in the adder base 11. As shown in FIG. 1 the adder base 11 comprises a first cell 14, a second cell 16, a third cell 18, an ith cell 20, an $(n-1)$th cell 22 and an nth cell 24.

The ith cell 20, $i > 1$, is an electronic digital circuit. Its inputs are $A_i$, $B_i$, and $C_{i-1}$. Its outputs are $E_i$, $\Sigma_i$, and $C_i$. The truth table of the output of the ith cell is:

| $A_i$ | $B_i$ | $C_{i-1}$ | $E_i$ | $\Sigma_i$ | $C_i$ |
|---|---|---|---|---|---|
| 0 | 0 | 0 | 0 | 0 | 0 |
| 0 | 0 | 1 | 0 | 1 | 0 |
| 0 | 1 | 0 | 1 | 1 | X |
| 0 | 1 | 1 | 1 | 0 | X |
| 1 | 0 | 0 | 1 | 1 | X |
| 1 | 0 | 1 | 1 | 0 | X |
| 1 | 1 | 0 | 0 | 0 | 1 |
| 1 | 1 | 1 | 0 | 1 | 1 |

Where $A_i$ and $B_i$ are the ith bits of the addends A and B respectively as described previously. $\Sigma_i$ is the ith bit of A+B. $C_i$ and $C_{i-1}$ are the input and output carries of the ith cell respectively, for $i = 2, \ldots, n$. $C_n = 1$ means overflow. Also, X indicates that $C_i$ is electrically isolated from the other nodes of the ith cell and is undetermined. Also note that the state of $C_i$ is independent of $C_{i-1}$. $C_1$ is the output carry of the first cell 14.

The first cell 14, $i = 1$, is also an electronic digital circuit. Its inputs are $A_1$, and $B_1$. Its outputs are $\Sigma_1$, and $C_1$. The truth table of the output of the first cell is:

| $A_1$ | $B_1$ | $\Sigma_1$ | $C_1$ |
|---|---|---|---|
| 0 | 0 | 0 | 0 |
| 0 | 1 | 1 | 0 |
| 1 | 0 | 1 | 0 |
| 1 | 1 | 0 | 1 |

Figure 2:
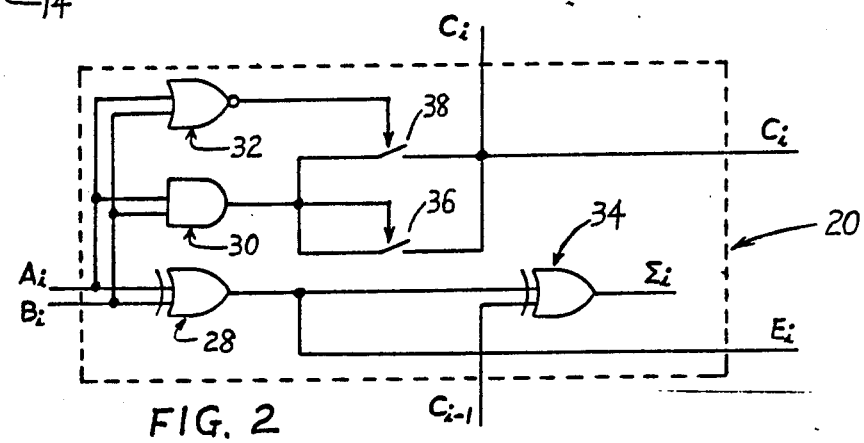
FIG. 2 is a logic diagram of an ith cell of an adder base portion of the adder depicted in FIG. 1, where $i > 1$.
Figure 3:
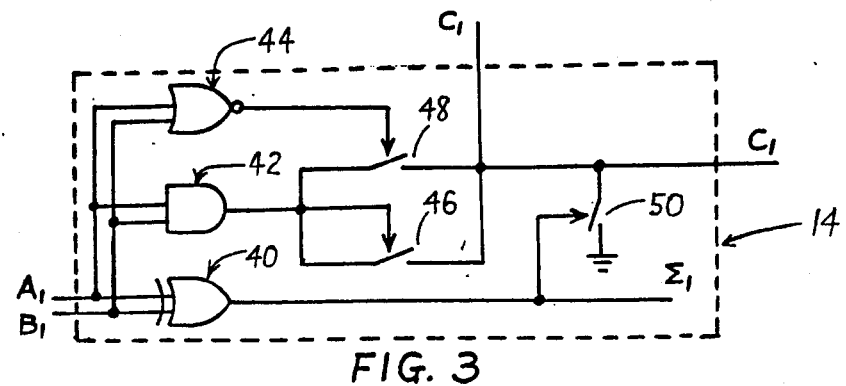
FIG. 3 is a logic diagram of a first cell of the adder base portion of the adder depicted in FIG. 1.
Figure 4:
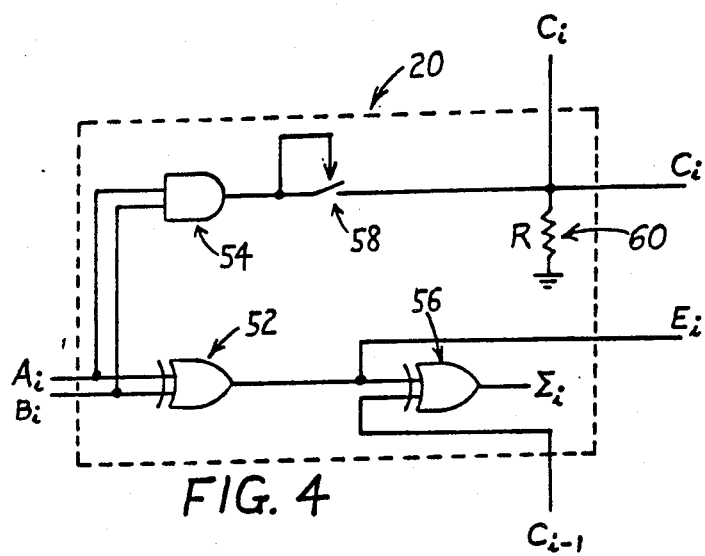
FIG. 4 is a logic diagram of the ith cell of an alternate embodiment of an adder base portion of the adder depicted in FIG. 1, where $i > 1$.
Figure 5:
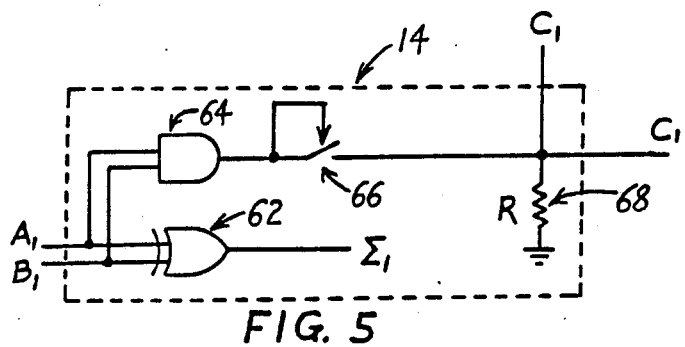
FIG. 5 is a logic diagram of the first cell of the alternate embodiment of the adder base portion of the adder depicted in FIG. 1.
Figure 6:
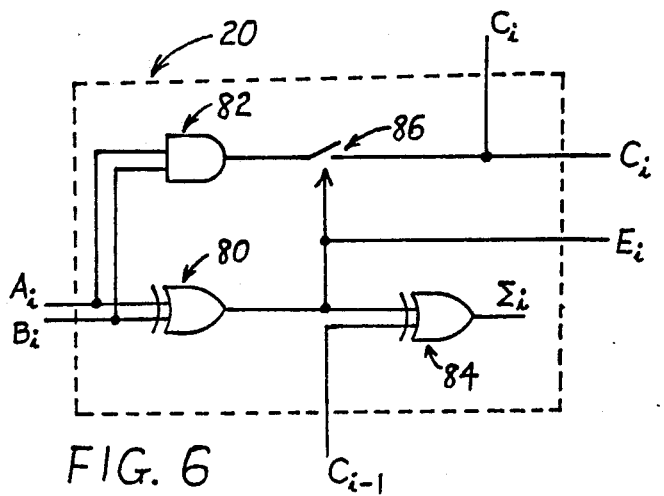
FIG. 6 is a logic diagram of the ith cell of the second alternate embodiment of an adder base portion of the adder depicted in FIG. 1, where $i > 1$.
Figure 7:
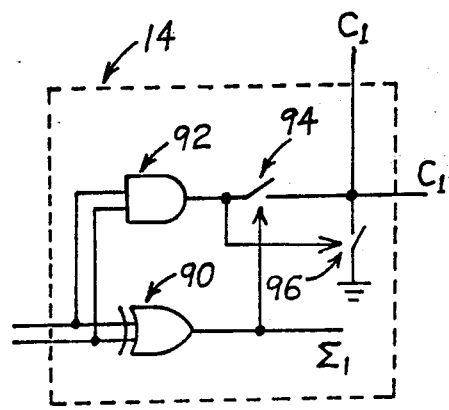
FIG. 7 is a logic diagram of the first cell of the second alternate embodiment of the adder base portion of the adder depicted in FIG. 1.

FIGS. 2, 4 and 6 are circuits which satisfy the ith cell truth table, $i > 1$. FIGS. 3, 5 and 7 are circuits which satisfy the first cell truth table.

Referring now to FIG. 2, there is shown a preferred embodiment of the ith cell 20 of the adder base 11 of the adder 10 depicted in FIG. 1, where $i > 1$. This cell will be called Double Switch Cell. The second cell 16 through the nth cell 24 of the adder 10 are each constructed in accordance with the logic diagram of the ith cell 20 depicted in FIG. 2. The only difference is that for the nth cell, the carry signal $C_n$ at carry node $C_n$ is an overflow signal whereas for the second cell 16 through the $(n-1)$th cell 22, the carry signal $C_i$ at carry node $C_i$ is a carry signal.

As shown in FIG. 2, the cell 20 comprises a first two-input exclusive OR gate 28, a two-input AND gate 30, a two-input NOR gate 32 and a second two-input exclusive OR gate 34. The ith bits $A_i$ and $B_i$ of the A addend and the B addend respectively are coupled to the inputs of the exclusive OR gate 28, the AND gate 30 and the NOR gate 32. The output $E_i$ of the first two-input exclusive OR gate 28 is coupled to the switch control 13 and one input of a second two-input exclusive OR gate 34. The second input of the second two-input exclusive OR gate 34 receives a carry signal $C_{i-1}$ from carry node $C_{i-1}$ of the preceeding cell. The output of the second exclusive OR gate 34 is a binary signal $\Sigma_i$ whose state is equal to the binary sum of states of the ith bits $A_i$ and $B_i$ of the two addends A and B plus the carry signal $C_{i-1}$ from the carry node $C_{i-1}$ of the preceeding cell.

The output of the two input AND gate 30 is coupled to a control input of a first switch 36, an input terminal of the first switch 36 and an input terminal of a second switch 38. The output of the two-input NOR gate 32 is coupled to a control input of the second switch 38. An output terminal of the first switch 36 is connected to an output terminal of the second switch 38. The first 36 and second 38 switches are preferably single pole, single throw switches in which a logical "1" signal applied to the control input causes the switch to close thereby electrically connecting the input terminal to the output terminal. A logical "0" applied to the control input causes the switch to open. The signal $C_i$, which is produced at the output terminals of the first 36 and second 38 switches is either a carry signal or an overflow signal as explained above. The signal $C_i$ is coupled to the switch network 12 and one input of the second two-input exclusive OR gate 34 of the next succeeding cell.

Referring now to FIG. 3, there is shown a preferred embodiment of the first cell 14 of the adder base 11 of the adder 10 depicted in FIG. 1. This cell will be called First Double Switch Cell. The first cell 14 comprises a two-input exclusive OR gate 40, a two-input AND gate 42 and a two-input NOR gate 44. The first bits $A_1$ and $B_1$ of the A addend and the B addend respectively are coupled to the inputs of the exclusive OR gate 40, the AND gate 42 and the NOR gate 44. The output of the two-input AND gate 42 is electrically connected to an input terminal of a first switch 46, a control input of the first switch 46 and an input terminal of a second switch 48. The output of the two-input NOR gate 44 is coupled to a control input of the second switch 48.

An output terminal of the first switch 46 is connected to an output terminal of the second switch 48 and an output terminal of a third switch 50. An input terminal of the third switch 50 is connected to ground. The output $\Sigma_1$ of the two-input exclusive OR gate 40 is coupled to a control input of the third switch 50. $\Sigma_1$ is a binary signal whose state is equal to the binary sum of the states of the first bits $A_1$ and $B_1$ of the two addends A and B. The first 46, second 48 and third 50 switches are preferably single pole, single throw switches in which a logical "1" signal applied to the control input will cause the switch to close thereby electrically connecting the input terminal to the output terminal. A logical "0" applied to the control input causes the switch to open. A binary carry signal $C_1$ is produced at the output terminals of the first 46, second 48 and third 50 switches. The carry signal $C_1$ is coupled to the switch network 12 and one input of the second two-input exclusive OR gate 34 of the second cell 16.

The cells depicted in FIGS. 2 and 3 operate as follows: In the first cell 14 depicted in FIG. 3, the output $\Sigma_1$ of the exclusive OR gate 40 is the sum of $A_1+B_1$ as previously described. When $A_1$ is a logical "1" ($A_1=1$) and $B_1$ is a logical "1" ($B_1=1$), the output of the AND gate 42 will be a logical "1" and the first switch 46 will be closed. Since, in this example, $A_1$ and $B_1$ both are logical "1"'s, the outputs of the NOR gate 44 and the exclusive OR gate 40 are each a logical "0"; therefore, the second switch 48 and the third switch 50 are both open. Since the first switch 46 is closed and the output of the AND gate 42 is a "1", the carry signal $C_1$ applied to the second cell and to the switch network will be a "1".

When $A_1=1$ and $B_1=0$, or $A_1=0$ and $B_1=1$, both the first switch 46 and the second switch 48 will be open and the third switch 50 will be closed. Consequently, the carry signal $C_1$ will be at ground potential which, in accordance with the exemplary convention used in the detailed description, will be a logical "0". When $A_1=0$ and $B_1=0$, the first switch 46 and the third switch 50 will be open, and the second switch 48 will be closed since the output of NOR gate 44 is a "1". Consequently, the carry signal $C_1$ will be that appearing at the output of the AND gate 42 which is, in this example, a "0".

Referring again to FIG. 2, the ith cell 20 operates as follows. The output $\Sigma_i$ of the second exclusive OR gate 34 is the sum of $A_i+B_i+C_{i-1}$ as previously described. When $A_i=1$ and $B_i=1$, the output of AND gate 30 is 1 and the output of NOR gate 32 is 0. Consequently, the first switch 36 will be closed and the second switch 38 will open. Therefore, the carry signal $C_i$ will be 1. When $A_i=1$ and $B_i=0$, or $A_i=0$ and $B_i=1$, the outputs of AND gate 30 and NOR gate 32 are each 0. Therefore, both of the switches 36 and 38 will be open. Accordingly, the carry signal $C_i$ can not be determined by $A_i$ and $B_i$. The previous bits of $A_i$, $B_i$ will determine the carry signal $C_i$ by passing through the switch network 12 in FIG. 1 as will be subsequently described. When $A_i=0$ and $B_i=0$, the first switch 36 will be open since the output of the AND gate 30 is 0; and the second switch 38 will be closed since the output of the NOR gate 32 is 1. Consequently, the carry signal $C_i$ is 0.

Referring now to FIG. 4, there is shown a logic diagram of an alternate preferred embodiment of the ith cell 20 of the adder base 11 of the adder 10 depicted in FIG. 1, where $i>1$. This cell will be called Resistor Supported Single Switch Cell. The second cell 16 through the nth cell 24 of the adder 10 are, in this alternate preferred embodiment, each constructed in accordance with the logic diagram of the ith cell 20 depicted in FIG. 4. The only difference is that for the nth cell, $C_n$ is an overflow signal whereas for the second 16 through the (n−1)th 22 cells, the $C_i$ signal is a carry signal.

As shown in FIG. 4, the cell 20 comprises a first two-input exclusive OR gate 52, a two-input AND gate 54 and a second two-input exclusive OR gate 56. The ith bits $A_i$ and $B_i$ of the A addend and the B addend respectively are coupled to the inputs of the first exclusive OR gate 52 and the AND gate 54. The output $E_i$ of the first exclusive OR gate 52 is coupled to the switch control 13 and one input of a second two-input exclusive OR gate 56. The second input of the second exclusive OR gate 56 receives a carry signal $C_{i-1}$ from the preceeding cell. The output of the second exclusive OR gate 56 is a binary signal $\Sigma_i$ whose state is equal to the binary sum of the states of the ith bits $A_i$ and $B_i$ of the two addends A and B plus the carry signal $C_{i-1}$ from the preceeding cell. The output of the AND gate 54 is coupled to an input terminal and a control input of a switch 58. An output terminal of the switch 58 is coupled to one terminal of a circuit element having electrical resistance, such as a resistor 60, the switch network 12 and one input of the second exclusive OR gate 56 of the next succeeding (i+1)th cell. The other terminal of the resistor 60 is electrically connected to ground. The switch 58 is preferably a single pole, single throw switch in which a logical "1" signal applied to the control input will cause the switch to close thereby electrically connecting the input terminal of the switch to the output terminal. A logical "0" applied to the control input causes the switch 58 to open. The signal $C_i$ is produced at the output terminal of the switch 58 and is either a carry signal or an overflow signal as explained above.

Referring now to FIG. 5, there is shown an alternate preferred embodiment of the first cell 14 of the adder base 11 of the adder 10 depicted in FIG. 1. This cell will be called First Resistor Supported Single Switch Cell. The first cell 14 comprises a two-input exclusive OR gate 62 and a two-input AND gate 64. The first bits $A_1$ and $B_1$ of the A addend and the B addend respectively are coupled to the inputs of the exclusive OR gate 62 and the AND gate 64. The output of the exclusive OR gate 62 is a binary signal $\Sigma_1$ whose state is equal to the sum of the states of the first bits $A_1$ and $B_1$ of the two addends A and B. The output of the AND gate 64 is electrically connected to an input terminal and the control terminal of a switch 66. An output terminal of the switch 66 is electrically connected to one terminal of a circuit element having electrical resistance, such as a resistor 68, the switch network 12 and one input of the second exclusive OR gate 56 of the second cell 16. The other terminal of the resistor 68 is electrically connected to ground. The switch 66 is preferably a single pole, single throw switch in which a logical "1" signal applied to the control input will cause the switch to close thereby electrically connecting the input terminal to the output terminal. A logical "0" applied to the control input causes the switch 66 to open. A binary carry signal $C_1$ is produced at the output terminal of the switch 66 and is coupled to an input of the second exclusive OR gate 56 of the second cell 16 as well as to the switch network 12 as previously described.

The alternate embodiment of the cells depicted in FIGS. 4 and 5 operate as follows: In the first cell 14 depicted in FIG. 5, the output $\Sigma_1$ of the exclusive OR gate 62 is the sum of $A_1+B_1$ as previously described. When $A_1$ is a logical "1" ($A_1=1$) and $B_1$ is a logical "1" ($B_1=1$), the output of the AND gate 64 will be a logical "1" and the switch 66 will be closed. Consequently, the carry signal $C_1$ is a "1" which is applied to an input of the second exclusive OR gate 56 of the second cell 16 as well as to the switch network 12 as previously described. When either $A_1$ or $B_1$ or both $A_1$ and $B_1$ are zeros, the output of the AND gate 64 will also be a "0"; consequently, switch 66 will remain open. Accordingly, the carry signal $C_1$ will be a "0" since the output terminal switch 66 is connected to ground (which is logical "0" in the convention used in this detailed description) through resistor 68.

Referring again to FIG. 4, the output $E_i$ of exclusive OR gate 52 is the sum of the ith bits of the addends A and B; that is, $E_i=A_i+B_i$. This sum is coupled to the switch control 13 as well as one input of the second exclusive OR gate 56. Since the other input of the second exclusive OR gate 56 is the carry signal $C_{i-1}$ from the previous cell, the output $\Sigma_i$ of the second exclusive OR gate 56 is the sum of $A_i+B_i+C_{i-1}$. The carry signal $C_i$ of the ith cell 20 is generated the same way as the previously described carry signal $C_1$ from the first cell 14 depicted in FIG. 5.

Referring now to FIG. 6, there is shown a logic diagram of another alternate preferred embodiment of the ith cell 20 of the adder base 11 of the adder 10 depicted in FIG. 1, where $i>1$. This cell will be called Single Switch Cell. The second cell 16 through the nth cell 24 of the adder 10 are, in this alternate preferred embodiment, each constructed in accordance with the logic diagram of the ith cell 20 depicted in FIG. 6. The only difference is that for the nth cell, $C_n$ is an overflow signal whereas for the second 16 through the $(n-1)$th 22 cells, the $C_i$ signal is a carry signal.

As shown in FIG. 6, the cell 20 comprises a first two-input exclusive OR gate 80, a second two-input exclusive OR gate 84 and a two-input AND gate 82. The ith bits $A_i$ and $B_i$ of the A addend and the B addend respectively are coupled to the inputs of the first exclusive OR gate 80 and the AND gate 82. The output $E_i$ of the first exclusive OR gate 80 is coupled to a control input of a switch 86, the switch control 13 and one input of a second two-input exclusive OR gate 84.

The second input of the second exclusive OR gate 84 receives a carry signal $C_{i-1}$ from the preceeding cell. The output of the second exclusive OR gate 84 is a binary signal $\Sigma_i$ whose state is equal to the binary sum of the states of the ith bits $A_i$ and $B_i$ of the two addends A and B plus the carry signal $C_{i-1}$ from the preceeding cell. The output of the AND gate 82 is coupled to an input terminal of a switch 86.

An output terminal of the switch 86 is coupled to the switch network 12 and one input of the second two-input exclusive OR gate 84 of the next succeeding $(i+1)$th cell. The switch 86 is preferably a single pole, single throw switch in which a logical "0" signal applied to the control input will cause the switch to close thereby electrically connecting the input terminal of the switch to the output terminal. A logical "1" applied to the control input causes the switch 86 to open. The signal $C_i$ is produced at the output terminal of the switch 86 and is either a carry signal or an overflow signal as explained above.

Referring now to FIG. 7, there is shown another alternate preferred embodiment of the first cell 14 of the adder base 11 of the adder 10 depicted in FIG. 1. This cell will be called First Single Switch Cell. The first cell 14 comprises a two-input exclusive OR gate 90 and a two-input AND gate 92. The first bits $A_1$ and $B_1$ of the A addend and the B addend respectively are coupled to the inputs of the exclusive OR gate 90 and the AND gate 92.

The output of the exclusive OR gate 90 is a binary signal $\Sigma_1$ whose state is equal to the sum of the states of the first bits $A_1$ and $B_1$ of the two addends A and B. The output of the exclusive OR gate 90 is coupled to a control input of a first switch 94. The output of the two-input AND gate 92 is electrically connected to an input terminal of the switch 94, a control input of a second switch 96. An output terminal of the first switch 94 is electrically connected to an output terminal of the second switch 96, the switch network 12 and one input of the second exclusive OR gate 84 of the second cell 16.

An input terminal of the second switch 96 is connected to ground. The first 94 and the second 96 switches are preferably a single pole, single throw switch in which a logical "0" signal applied to the control input will cause the switch to close thereby electrically connecting the input terminal to the output terminal. A logical "1" applied to the control input causes the switch 94 to open. A binary carry signal $C_1$ is produced at the output terminal of the switch 94 and is coupled to an input of the second exclusive OR gate 84 of the second cell 16 as well as to the switch network 12 as previously described.

The alternate embodiment of the cells depicted in FIGS. 6 and 7 operate as follows: In the first cell 14 depicted in FIG. 7, the output $\Sigma_1$ of the exclusive OR gate 90 is the sum of $A_1+B_1$ as previously described. When $A_1$ is a logical "1" ($A_1=1$) and $B_1$ is a logical "1" ($B_1=1$), the output of the AND gate 92 will be a logical "1", the output of the exclusive OR gate 90 will be a logical "0" and the first switch 94 will be closed, the second switch 96 will be open. Consequently, the carry signal $C_1$ is a "1" which is applied to an input of the second exclusive OR gate 84 of the second cell 16 as well as the switch network 12 as previously described.

When $A_1=1$ and $B_1=0$, or $A_1=0$ and $B_1=1$, the output of the AND gate 92 is a "0", the output of the exclusive OR gate 90 is a "1"; therefore, the first switch 94 will be open and the second switch 96 will be closed. Accordingly, the carry signal $C_1$ will be a "0" since the input terminal of the second switch 96 is connected to ground (which is logical "0" in the convention used in this detailed description). When $A_1=0$ and $B_1=0$, both of the outputs of the exclusive OR gate 90 and the AND gate 92 are a "0". Therefore, both of the first switch 94 and the second switch 96 will be closed. Consequently, the carry signal $C_1$ applied to the second cell and to the switch network will be a "0".

Referring again to FIG. 6, the output $E_i$ of the first exclusive OR gate 80 is the sum of the ith bits of the addends A and B; that is, $E_i = A_i + B_i$. This sum is coupled to the switch control 13 as well as one input of the second exclusive OR gate 84. Since the other input of the second exclusive OR gate 84 is the carry signal $C_{i-1}$ from the previous cell, the output $\Sigma_i$ of the second exclusive OR gate 84 is the sum of $A_i + B_i + C_{i-1}$.

When $A_i = 1$ and $B_i = 1$, the output of the AND gate 82 is a "1" and the output of the first exclusive OR gate is a "0". Consequently, the switch 86 will be closed. Therefore, the signal $C_i$ will be a "1". When $A_i = 1$ and $B_i = 0$, or $A_i = 0$ and $B_i = 1$, the outputs of the AND gate 82 is a "0". The output of the first exclusive OR gate will be a "1". Consequently, the switch 86 will be open. Accordingly, the carry signal $C_i$ can not be determined by $A_i$ and $B_i$. The previous bits of $A_i$, $B_i$ will determine the carry signal $C_i$ by passing through the switch network 12 in FIG. 1 as will be subsequently described. When $A_i = 0$ and $B_i = 0$, both of the output of the first exclusive OR gate 80 and the AND gate 82 are a "0". Consequently, the switch 86 will be closed. Therefore, the signal $C_i$ is a "0".

Figure 8:
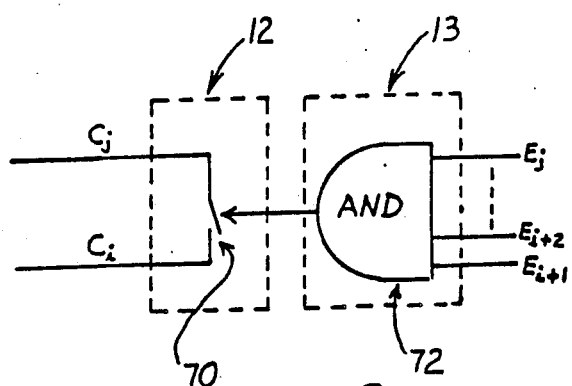
FIG. 8 is a logic diagram of an exemplary switch control of switch network and switch control portion of the preferred embodiment of the adder depicted in FIG. 1.

Referring now to FIG. 8, there is shown an exemplary portion of the switch network 12 and the switch control 13. The switch network 12 comprises at least one switch 70. Each switch 70 is preferably a single pole, single throw switch having a first terminal, a second terminal and a control input. A logical "1" signal applied to the control input causes the switch 70 to close thereby electrically connecting the first and second terminals. A logical "0" applied to the control input causes the switch 70 to open. As shown in FIG. 8, the carry signal $C_j$ from the jth cell is electrically connected to one of the switch terminals and the carry signal $C_i$ from the ith cell is electrically connected to the other terminal. The output from an AND gate 72 of the switch control 13 is electrically connected to the control terminal of the switch 70. As shown in FIG. 8, the AND gate 72 has multiple inputs which receive the E signals from the (i+1)th cell, (i+2)th cell, . . . , and the jth cell, where i<j. The anded output of these E signals controls the switch connection (switch 70) between the carry signal nodes $C_i$ and $C_j$ of the ith cell and the jth cell respectively.

Figure 9:
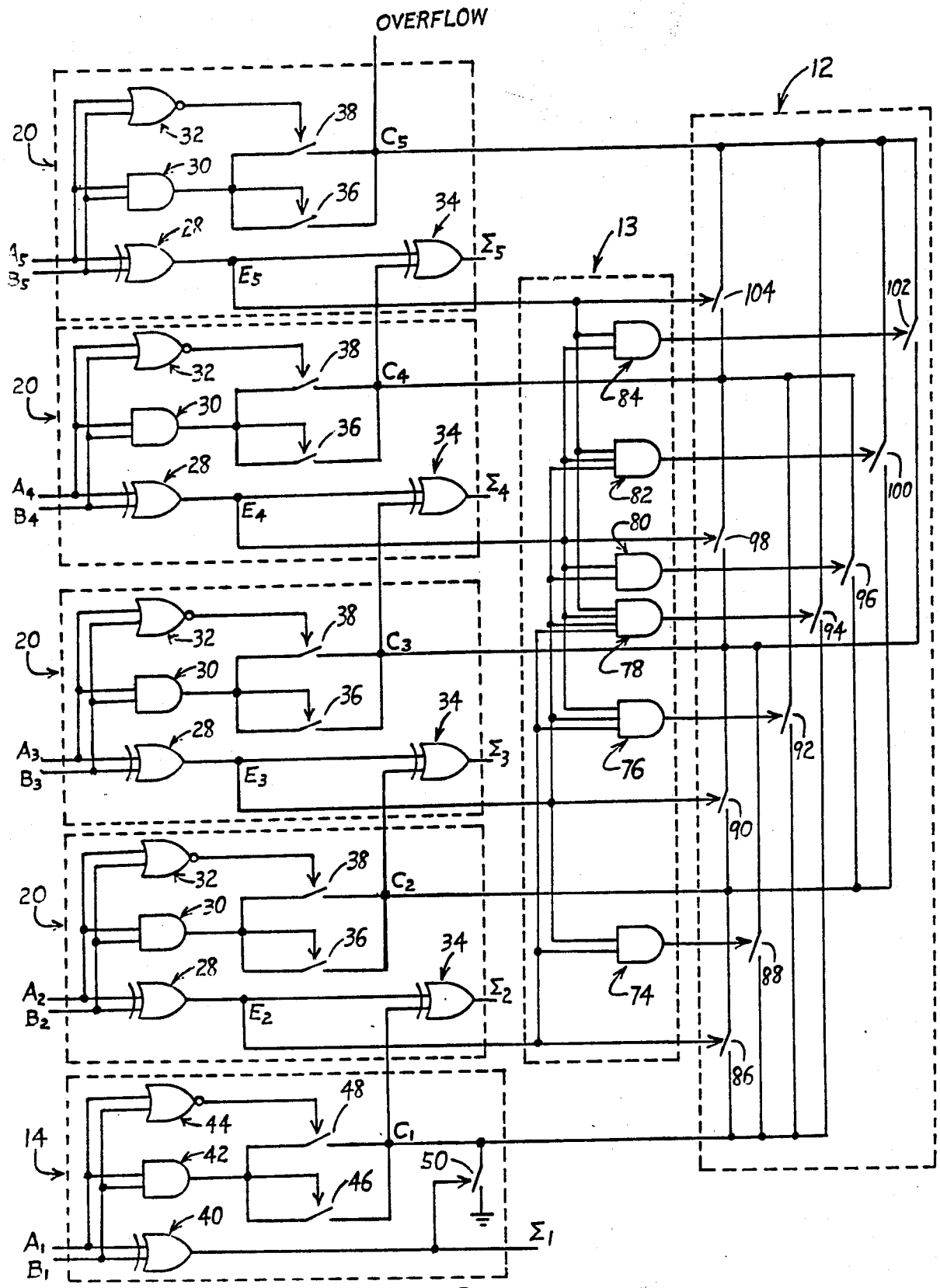
FIG. 9 is a logic diagram of a preferred embodiment of an adder circuit in accordance with the present invention for adding two five bit binary numbers.

Referring now to FIG. 9, there is depicted a five bit adder, that is n=5, constructed in accordance with the preferred embodiment of the present invention depicted generally in FIG. 1. The first cell 14 (i=1) is constructed in accordance with the first alternate preferred embodiment depicted in FIG. 3 and the ith cells 20 (i=2, 3, 4, 5) are constructed in accordance with the first alternate preferred embodiment depicted in FIG. 2. The switch control 13 comprises a first two-input AND gate 74, a first three-input AND gate 76, a four-input AND gate 78, a second two-input AND gate 80, a second three-input AND gate 82 and a third two-input AND gate 84. The switch network 12 comprises a first switch 86, a second switch 88, a third switch 90, a fourth switch 92, a fifth switch 94, a sixth switch 96, a seventh switch 98, a eighth switch 100, a ninth switch 102 and a tenth switch 104.

The first carry signal node $C_1$ is connected to a terminal of the first, second, fourth and fifth switches, 86, 88, 92 and 94 respectively. The second carry signal node $C_2$ is connected to the other terminal of the first switch 86, a terminal of the third switch 90, a terminal of the sixth switch 96 and a terminal of the eighth switch 100. The carry signal node $C_3$ of the third cell is connected to the other terminal of the third switch 90, the other terminal of the second switch 88, a terminal of the seventh switch 98 and a terminal of the ninth switch 102. The carry signal node $C_4$ of the fourth cell is connected to the other terminal of the seventh switch 98, the other terminal of the fourth switch 92, the other terminal of the sixth switch 96 and a terminal of the tenth switch 104. The carry signal node $C_5$ of the fifth cell is connected to the other terminal of the tenth switch 104, the other terminal of the fifth switch 94, the other terminal of the eighth switch 100 and the other terminal of the ninth switch 102.

The $E_2$ signal from the second cell is coupled to the control input of the first switch 86, one input of the first two-input AND gate 74, one input of the first three-input AND gate 76 and one input of the four-input AND gate 78. The $E_3$ signal from the third cell is coupled to the other input of the first two-input AND gate 74, the control input of the third switch 90, a second input of the first three-input AND gate 76, a second input of the four-input AND gate 78, one input of the second two-input AND gate 80 and one input of the second three-input AND gate 82.

The $E_4$ signal from the fourth cell is coupled to the third input of the first three-input AND gate 76, a third input of the four-input AND gate 78, the other input of the second two-input AND gate 80, the control input of the seventh switch 98, a second input of the second three-input AND gate 82 and one input of the third two-input AND gate 84. The $E_5$ signal from the fifth cell is coupled to the fourth input of the four-input AND gate 78, the third input of the second three-input AND gate 82, the other input of the third two-input AND gate 84 and the control input of the tenth switch 104.

The operation of the five bit adder depicted in FIG. 9 will be described utilizing an example where addend A comprises the five binary bits $A_5 = 0$, $A_4 = 1$, $A_3 = 0$, $A_2 = 1$ and $A_1 = 1$; that is, addend A is the 5 bit binary number 01011. The addend B comprises the five binary bits $B_5 = 0$, $B_4 = 0$, $B_3 = 1$, $B_2 = 0$ and $B_1 = 1$; that is, addend B is the 5 bit binary number 00101. Since $A_1 = 1$ and $B_1 = 1$, the output $\Sigma_1$ of the exclusive OR gate 40 of the first cell 14 is 0. Therefore the sum $\Sigma_1$ of first bits $A_1$ and $B_1$ of the addends A and B respectively is 0, hence switch 50 is open. The output of the AND gate 42 is 1 which causes switch 46 to close while the output of the NOR gate 44 is 0 causing switch 48 to open. Consequently, the first carry signal $C_1$ is a "1".

Since $A_2 = 1$ and $B_2 = 0$, the output $E_2$ of the exclusive OR gate 28 of the second cell is a "1". Since $E_2 = 1$ and $C_1 = 1$ the output $\Sigma_2$ of the second exclusive OR gate 34 of the second cell is "0". Also, since $E_2 = 1$, the first switch 86 of the switch network 12 closes. Because $A_2 = 1$ and $B_2 = 0$, the output of the AND gate 30 and the output of the NOR gate 32 of the second cell are both equal to "0" which causes switches 36 and 38 to open. However, since the first switch 86 of the switch network 12 is closed, and $C_1 = 1$, the carry signal $C_2$ of the second cell is also "1".

Since $A_3 = 0$ and $B_3 = 1$, the output of $E_3$ of the exlusive OR gate 28 of the third cell is a "1". Since $E_3 = 1$ and $C_2 = 1$, the output $\Sigma_3$ of the second exclusive OR gate 34 is "0". Also, since $E_3 = 1$, the third switch 90 of the switch network closes. Because both $E_3$ and $E_2$ are each a "1", the output of the first two-input AND gate 74 is also a "1" which closes the second switch 88 of the switch network 12. Since $A_3=0$ and $B_3=1$, the outputs of the AND gate 30 and the NOR gate 32 of the third cell are both "0" which causes the switches 36 and 38 of the third cell to open. However, since the third switch 90 of the switch network 12 is closed and $C_2=1$, the third carry signal $C_3$ from the third cell is also a "1".

Since $A_4=1$ and $B_4=0$, the output $E_4$ of the first exclusive OR gate 28 of the fourth cell is "1". Since $E_4=1$, the seventh switch 98 of the switch network 12 closes. Also, since $E_4=1$ and $C_3=1$, the output $\Sigma_4$ of the second exclusive OR gate 34 of the fourth cell is "0". Because $A_4=1$ and $B_4=0$, the outputs of the AND gate 30 and NOR gate 32 will both be "0" which causes the switches 36 and 38 of the fourth cell to open. However, since $C_3=1$ and the seventh switch 98 of the switch network 12 is closed, the fourth carry signal $C_4$ will also be a "1".

Since $A_5=0$ and $B_5=0$, the output of $E_5$ of the first exclusive OR gate 28 in the fifth cell is "0". Since $E_5=0$ and $C_4=1$, the output $\Sigma_5$ of the second exclusive OR gate 34 of the fifth cell is "1". Also, since $E_5=0$, the tenth switch 104 of the switch network 12 is open. Because $A_5=0$ and $B_5=0$, the output of AND gate 30 is "0". Consequently, switch 36 is in the open position and switch 38 has a "0" at its input terminal. Since $A_5=0$ and $B_5=0$, the output of the NOR gate 32 is a "1" which causes switch 38 to close. Since the input terminal of switch 38 is a "0", the overflow signal $C_5$ is also a "0". Also, since the tenth switch 104 of the switch network 12 is open, this prevents the fourth carry signal $C_4$ from being applied to the overflow signal node $C_5$. Therefore, as can be seen from the above description, the result of the addition is $A+B=10000$ since $\Sigma_5=1$, $\Sigma_4=0$, $\Sigma_3=0$, $\Sigma_2=0$ and $\Sigma_1=0$.

The purpose of switch network 12 is to supply paths between carry nodes for the carry signal propagation. The switch network 12 which gives the fastest carry propagation paths is the network which connects a single switch between any two distinct carry nodes. Such a switch network requires $n(n-1)/2$ switches where n is equal to the number of bits in each addend. When n is large, the number of switches in the switch network may be large enough that the adder becomes impractical. Therefore, a switch network with a smaller number of switches, at a concomitant cost of decreasing the speed of carry propagation, is needed when n is large. The following definitions are used in the subsequent detailed description of the procedure for designing a fast carry adder in accordance with the present invention wherein the number of switches required is less than $n(n-1)/2$ while at the same time the carry signal propagation delay will be no greater than a preselected delay "d".

Definition 1: A sub-sequence of the sequence of pair of bits of the addends A and B $(A_1, B_1), (A_2, B_2), \ldots, (A_n, B_n)$ is called an E-sequence of A and B if all the subscripts of the sub-sequence are consecutive integers, and each pair of bits $(A_i, B_i)$ in the sub-sequence is in the form of either $A_i=1$ and $B_i=0$ or $A_i=0$ and $B_i=1$. If $(A_i, B_i), (A_{i+1}, B_{i+1}), \ldots, (A_k, B_k)$ is an E-sequence, the sequence of carry nodes $C_i, C_{i+1}, \ldots, C_k$ will be called the associated C-sequence of the E-sequence. Note that the E-sequence and its associated C-sequence are determined by the value of addends.

Definition 2: An E-sequence of A and B, say Q, is called a maximum E-sequence of A and B if Q is not a part of another E-sequence of A and B. For example, where

| A = 0 1 1 1 0 1 0 1 | (the right-most bit being $A_1$) |
|---|---|
| B = 0 0 0 0 1 0 0 1 | (the right-most bit being $B_1$) | then $(A_5, B_5), (A_6, B_6), (A_7, B_7)=(1,0), (1,0),$ (1,0) is an E-sequence of A and B, but not a maximum E-sequence of A and B. $(A_3, B_3), \ldots, (A_7, B_7)=(1,0)$ (0,1), (1,0), (1,0), (1,0) is a maximum E-sequence of A and B. Hereinafter, whenever the term E-sequence is used, it means the E-sequence of two addends A and B.

Definition 3: A pair of bits in the form of (1,1) or (0,0) immediately followed by a maximum E-sequence is called a One E-sequence and a Zero E-sequence respectively. For example, where

| A = 1 0 0 1 1 0 0 1 1 1 0 1 0 1 |
|---|
| B = 1 1 1 0 1 1 0 0 0 0 1 0 0 1 | then $(A_2, B_2), \ldots, (A_7, B_7)=(0,0), (1,0), (0,1),$ (1,0), (1,0), (1,0) is a Zero E-sequence; and $(A_{10}, B_{10}), \ldots, (A_{13}, B_{13})=(1,1), (1,0),$ (0,1), (0,1) is a One E-sequence.

Definition 4: Associated with each maximum E-sequence, $(A_i, B_i), \ldots, (A_k, B_k)$, the sequence of carry nodes $C_i, \ldots, C_k$ is called a maximum C-sequence. Associated with each One E-sequence, $(A_i, B_i), \ldots, (A_k, B_k)$, the sequence of carry nodes $C_i, \ldots, C_k$ is called a One C-sequence.

According to the definition of maximum C-sequence, two maximum C-sequences $P=C_i, \ldots, C_k$ and $Q=C_r, \ldots, C_t$ of the addends A and B will be either P=Q or $r>k+1$ or $i>t+1$. The detail proof is as follows: P=Q means i=r and k=t. Assume P≠Q. There are eight cases for P≠Q, $r>i$ and $t>k$, $r>i$ and t=K, $r>i$ and $t<k$, r=i and $t>k$, r=i and $k>t$, $r<i$ and t=k, $r<i$ and $t<k$, $r<i$ and $k<t$. With no loss of generality, it is sufficient to prove the case of $r>i$ and $t>k$ only. $P=C_i, \ldots, C_k$ and $Q=C_r, \ldots, C_t$ are maximum C-sequences means $(A_i, B_i), \ldots, (A_k, B_k)$ and $(A_r, B_r), \ldots, (A_t, B_t)$ are maximum E-sequences. This means $i, i+1, \ldots, k$ and $r, r+1, \ldots, t$ are two sequences of consecutive integers. Suppose $r \leq k+1$, then $i, i+1, \ldots, k, \ldots, t$ is a sequence of consecutive integers, since $i, i+1, \ldots, k$ and $r, r+1, \ldots, t$ are two sequence of consecutive integers. This means $(A_i, B_i), (A_{i+1}, B_{i+1}), \ldots, (A_k, B_k), \ldots, (A_t, B_t)$ is an E-sequence which contains but not equals to $(A_i, B_i), \ldots, (A_k, B_k)$. This contradict to the fact of $(A_i, B_i), \ldots, (A_k, B_k)$ being a maximum E-sequence. Therefore, the supposition r, k+1 is false. Hence, $r>k+1$. The geometry meaning of the conditions $r>k+1$ or $i>t+1$ is that two different maximum C-sequences are always separated by at least one bit m. In the above case of $r>k+1$, the signal of $E_{k+1}$ must be logical "0". Otherwise, $(A_i, B_i), \ldots, (A_k, B_k), (A_{k+1},$ $B_{k+1}$) will be an E-sequence which contains but not equals to $(A_i, B_i), \ldots, (A_k, B_k)$. This contradict to the fact of $(A_i, B_i), \ldots, (A_k, B_k)$ being a maximum E-sequence. Therefore, at least one bit m which separate two different maximum C-sequences has the value $E_m=0$. For example, if $C_8, C_9, C_{10}, C_{11}$ is a maximum C-sequence, then none of $C_{12}, C_{13}, C_{14}$ and $C_4, C_5, C_6, C_7$ can be a maximum C-sequence. Because $C_{12}$, the first term of the sequence $C_{12}, C_{13}, C_{14}$, has not separated from $C_{11}$, the last term of the maximum C-sequence $C_8, C_9, C_{10}, C_{11}$, by at least one bit. Same reason, the last term of the sequence $C_4, C_5, C_6, C_7$ has not separated from the first term of the maximum C-sequence by at least one bit. The sequences $C_{13}, C_{14}, \ldots,$ or $C_{14}, C_{15}, \ldots,$ are all qualified, but not necessary, to be the candidate of a maximum C-sequence. Same reason, all the sequences $\ldots, C_4, C_5, C_6,$ or $\ldots, C_4, C_5,$ are also qualified, but not necessary, to be the candidate of a maximum C-sequence.

Definition 5: Associated with each Zero E-sequence, $(A_i, B_i), \ldots, (A_k, B_k)$, the sequence of carry nodes $C_i, \ldots, C_k$ is called a Zero C-sequence. A one C-sequence, a Zero C-sequence, or a maximum C-sequence with $C_1$ as the first term is called a universal C-sequence. In fact, a maximum C-sequence with $C_1$ as the first term can also be considered as a Zero C-sequence since $C_1$ is always connected to ground when $C_1$ is the first term of a maximum C-sequence as described in the descriptions of FIGS. 3, 5 and 7.

Recall carry propagation of the addition of two binary digital numbers. The carry "1" of the ith pair of bits ($A_i=1$, $B_i=1$) of the addends A and B need propagate to each carry node in the One C-sequence with $C_i$ as its first term. For a Zero C-sequence Y, each carry node in Y need has logical "0". Therefore, the studying of carry propagation of the addition of two binary digital numbers and the studying of how the logical signal of the first carry node of a universal C-sequence W propagate to each carry node of W are equivalent.

Figure 10:
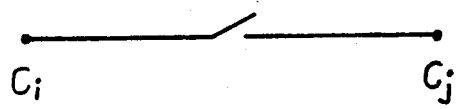
FIG. 10 is a schematic representation of a carry node $C_i$ which is switch connected to another carry node $C_j$.

Definition 6: The phrase "carry node $C_i$ switch connected to another carry node $C_j$" meand $C_i$ is connected to one terminal of a switch and $C_j$ connected to another terminal of that switch, as shown in FIG. 10. Two nodes are electrically connected means the resistance between these two nodes is so low that can be considered zero. Two nodes are electrically idolated means the resistance between these two nodes is so high that can be considered infinite.

In all the description of this invention, if a switch which switch connect two carry nodes, it is always preferably single pole, single throw switch in which a logical "1" signal applied to the control input causes the switch to close thereby electrically connecting the input terminal of the output terminal. A logical "0" signal applied to the control input causes the switch to open.

The switch control gate as shown in FIG. 8, has the property that a switch will be closed if and only if it switch connects two carry nodes which are in the same universal C-sequence. This property will be proved as follows: Let $C_i, C_{i+1}, \ldots, C_k$ be a universal C-sequence. Then $(A_i, B_i), (A_{i+1}, B_{i+1}), \ldots, (A_k, B_k)$ is a universal E-sequence. The signals $E_{i+1}, \ldots, E_k$ on the nodes $E_{i+1}, \ldots, E_k$ as shown in FIG. 1, are the digital logic "1". A switch S which switch connect any two carry nodes in the sequence $C_i, C_{i+1}, \ldots, C_k$, the control signal of switch S will be logical "1" according to the depiction of FIG. 8. Therefore, the switch S will be closed. In the other direction, let $W=C_i, \ldots, C_k, \ldots,$ $C_p$, be a universal C-sequence, and $C_r$ be a carry node which is not belongs to W. Then $E_{p+1}$ must has logical "0", since W is a universal C-sequence and $C_p$ is the last term of W. Since $C_r$ not belongs to W, then either $r>p$ or $r<i$. In case of $r>p$, the control of switch S which switch connect the carry nodes $C_k$ and $C_r$ will be logical "0" since $E_{p+1}=0$. Hence the switch S will be open. In case of $r<i$, no such r exist if $i=1$. Assume $i>1$, then W is either a One C-sequence or a Zero C-sequence. In iether case, $E_i$ is logical "0" and $E_i$ is one of the inputs of the control AND gate of switch S as depicted in FIG. 8. Therefore, switch S will be open and the carry nodes $C_k$, $C_r$ will be electrically isolated. According to the previous description, once the addends A and B input to the adder base 11 of adder 10 of FIG. 1, all the E-sequences and its associated C-sequences will be created. Any switch connect two carry nodes in the same universal C-sequence will always be closed. Any switch which switch connect two carry nodes which not belongs to the same universal C-sequences will always be open.

Figure 11:
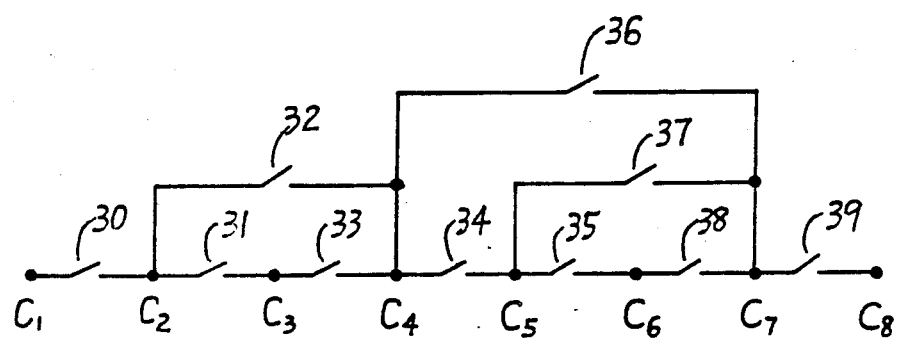
FIG. 11 is a schematic diagram of exemplary paths from carry node $C_2$ to carry node $C_7$ and a minimum path from carry node $C_2$ to carry node $C_7$.

Definition 7: A path from carry node $C_i$ to carry node $C_k$ is a sub-sequence of the sequence of carry nodes $C_1, C_2, \ldots, C_n$ with the property that any two consecutive terms of this sub-sequence are switch connected. A path from $C_i$ to $C_k$ with minimum number of switches, minimum in all paths from $C_i$ to $C_k$, is called the minimum path from $C_i$ to $C_k$. Examples are shown in FIG. 11 which contains eight carry nodes, $C_1$ through $C_8$ and ten switches. Switch 30 connects $C_1$ and $C_2$, switch 31 connects $C_2$ and $C_3$, switch 32 connects $C_2$ and $C_4$, switch 33 connects $C_3$ and $C_4$, switch 34 connects $C_4$ and $C_5$, switch 35 connects $C_5$ and $C_6$, switch 36 connects $C_4$ and $C_7$, switch 37 connects $C_5$ and $C_7$, switch 38 connects $C_6$ and $C_7$, and switch 39 connects $C_7$ and $C_8$.

As shown in FIG. 11, there are six paths from $C_2$ to $C_7$. A first path is from $C_2$ to $C_3$ through Switch 31; $C_3$ to $C_4$ through switch 33; $C_4$ to $C_5$ through switch 34; $C_5$ to $C_6$ through switch 35; $C_6$ to $C_7$ through switch 38. Consequently, the first path includes carry nodes $C_2, C_3, C_4, C_5, C_6,$ and $C_7$ as well as switches 31, 33, 34, 35 and 38. A second path is from $C_2$ to $C_3$ through switch 31; $C_3$ to $C_4$ through switch 33; $C_4$ to $C_5$ through switch 34; and $C_5$ to $C_7$ through switch 37. Therefore, the second path includes carry nodes $C_2, C_3, C_4, C_5$ and $C_7$ as well as switches 31, 33, 34 and 37. A third path is from $C_2$ to $C_3$ through switch 31; $C_3$ to $C_4$ through switch 33; $C_4$ to $C_7$ through switch 36. Consequently, the third path includes carry nodes $C_2, C_3, C_4$ and $C_7$ as well as switches 31, 33 and 36.

A fourth path is from $C_2$ to $C_4$ through switch 32; $C_4$ to $C_5$ through switch 34; $C_5$ to $C_6$ through switch 35; and $C_6$ to $C_7$ through switch 38. Accordingly, the fourth path includes carry nodes $C_2, C_4, C_5, C_6$ and $C_7$ as well as switches 32, 34, 35 and 38. A fifth path is from $C_2$ to $C_4$ through switch 32; $C_4$ to $C_5$ through switch 34; and $C_5$ to $C_7$ through switch 37. Consequently, the fifth path includes carry nodes $C_2, C_4, C_5$ and $C_7$ as well as switches 32, 34 and 37. Finally, a sixth path is from $C_2$ to $C_4$ through switch 32; and $C_4$ to $C_7$ through switch 36. Therefore, the sixth path includes carry nodes $C_2, C_4$ and $C_7$ as well as switches 32 and 36. The sixth path has two switches and is the minimum path from $C_2$ to $C_7$, since all of the other paths from $C_2$ to $C_7$ have more than two switches.

In order to describe the structure of a switch network in accordance with the present invention more efficiently, a coordinate system similar to a Cartesian rectangular coordinates system can be constructed by changing the x and y coordinates in Cartesian coordinates system to $C_x$ and $C_y$ respectively. The point (x,y) in the Cartisian coordinates system will be changed to $(C_x, C_y)$. The plane formed by points $(C_x, C_y)$ will be called the C-plane. The coordinates $C_i$ express the carry nodes $C_i$. An positive integer $S_{i,j}$ will be assigned to each point $(C_i, C_j)$ in the C-plane. The value of $S_{i,j}$ expresses the total number of switches in the minimum path from $C_i$ to $C_j$. The value $S_{i,j}$ is called the S value of the point $(C_i, C_j)$. An example of a C-plane for i=1, 2, ... 8; and j=1, 1, ... 7, is depicted in FIG. 12.

Figure 12:
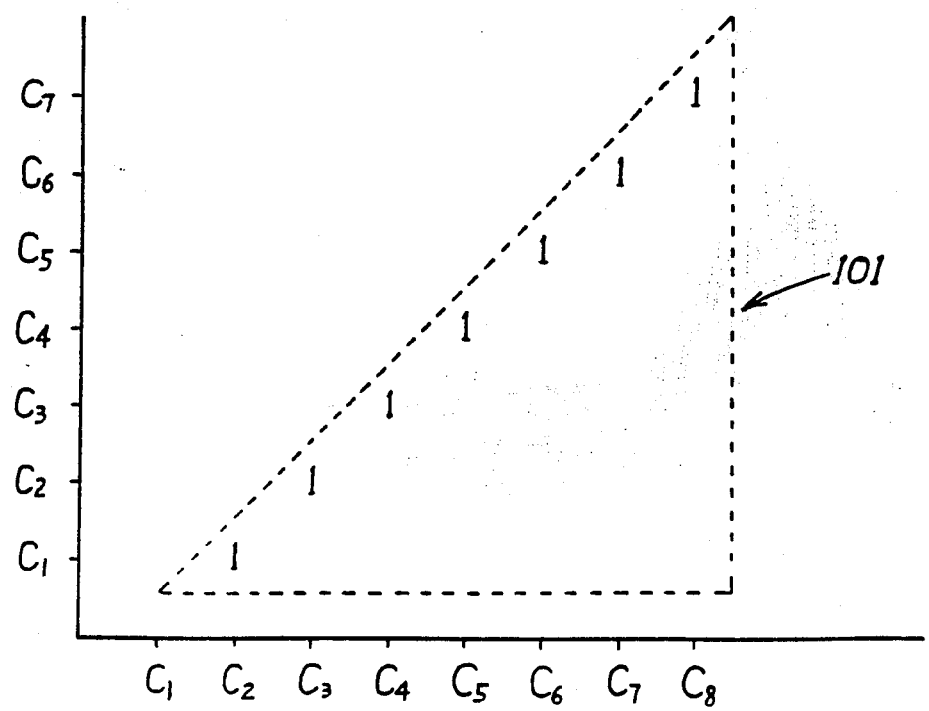
FIG. 12 depicts a form of C-triangle for a switch network of an 8 bit adder in accordance with the present invention.

No matter how the switch network is designed, the value of $S_{i,i-1}$ is always equal to 1, for i=2, ..., n (see FIG. 12). That means $C_i$ is always switch connected to $C_{i-1}$, for i=2, ..., n. Suppose there is $C_k$ which does not switch connect to $C_{k-1}$, then in the case of $A_i = 0$, for all i not equal to k−1 and k;
$A_i = 1$, for i=k−1 and k;
$B_i = 0$, for all i not equal to k−1; and
$B_i = 1$, for i=k−1;

$C_{k-1}$ will be equal to 1. The carry signal $C_{k-1}$ cannot propagate to the carry node $C_k$ because all the $E_i$ signals from the adder base 11 of the adder 10 depicted in FIG. 1 are 0, except i=k. Therefore, all switches will be open, except the switch which connects $C_{k-1}$ with $C_k$. Hence, the conclusion that $C_i$ must always be switch connected to $C_{i-1}$, for i=2, ..., n. That is, $S_{i,i-1}=1$ for i=2, ..., n.

Before carrying out the design procedure, it is desirable to decide the largest number of switches allowed in all minimum paths. This number will be denoted by d and called the delay number. The value of d will be determined by the desired size and speed of the adder. Speed can be increased but at the cost of increasing the number of switches and control gates. Decreasing of the number of switches and control gates is made at the cost of decreasing the speed.

On the C-plane, only the points $(C_i, C_j)$ with j<i will be used. The points $C_{2,1}$, $C_{n,1}$, and $C_{n,n-1}$ determine an equilateral right triangle. This triangle will be called a C-triangle. The value of each point on the hypotenuse of the C-triangle is always equal to 1, indicating that $C_i$ is switch connected to $C_{i-1}$, for i=2, ..., n as previously stated. Utilizing the aforementioned definition of $S_{i,j}$, designing a switch network in accordance with the present invention with a predetermined number d is equivalent to determining which points of the C-triangle will have a value of 1 such that the values of $S_{i,j}$ of each point on the C-triangle is not greater than d. The total number of the points at which the S value is 1 on the C-triangle is the total number of switches in the switch network. In FIG. 12, triangle 101 is the C-triangle for n=8 and the S values at the hypotenuse of the C-triangle 101 are 1.

Figure 13:
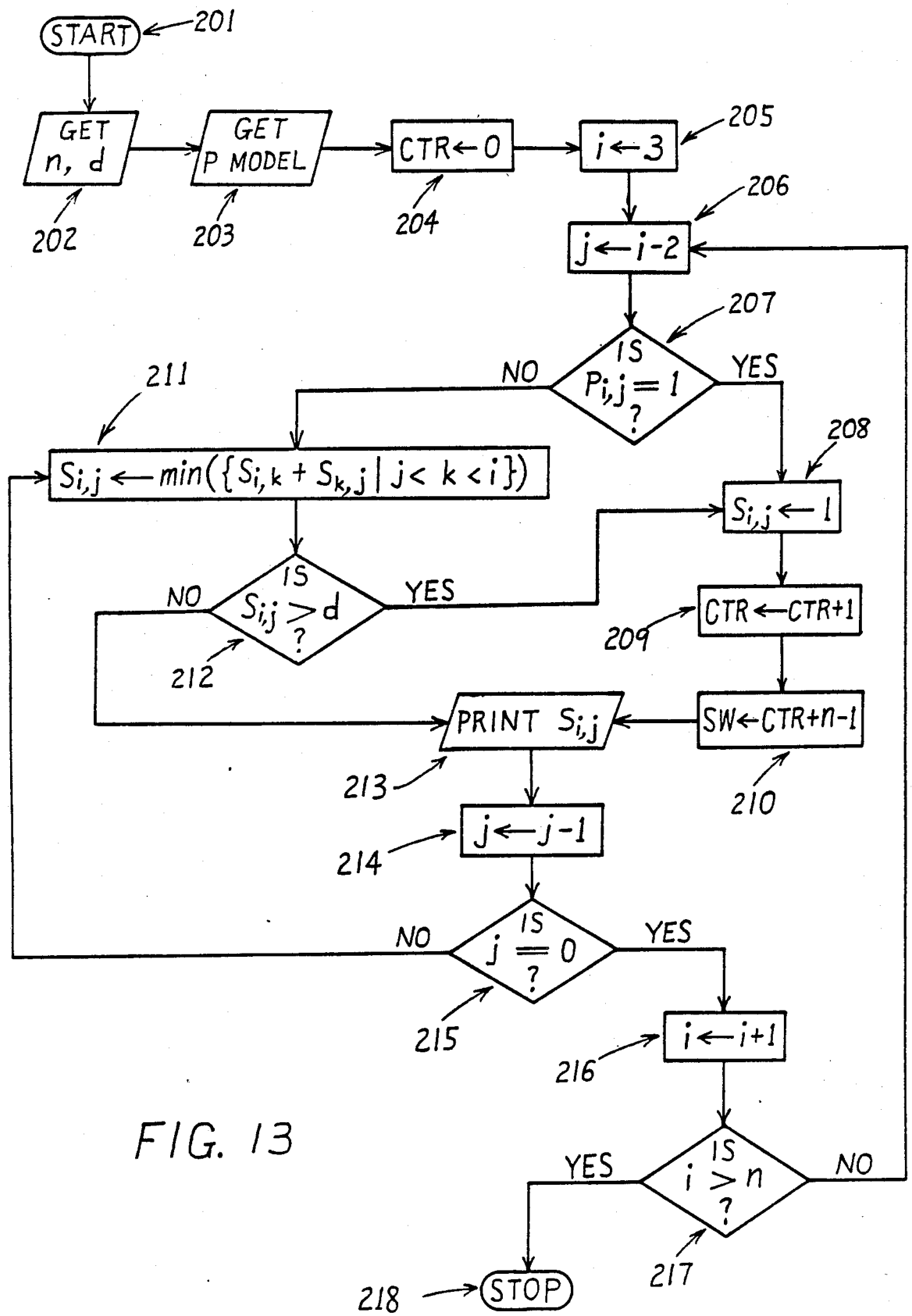
FIG. 13 is a flow chart of an algorithm for designing a switch network in accordance with the present invention.
Figures 14, 15:
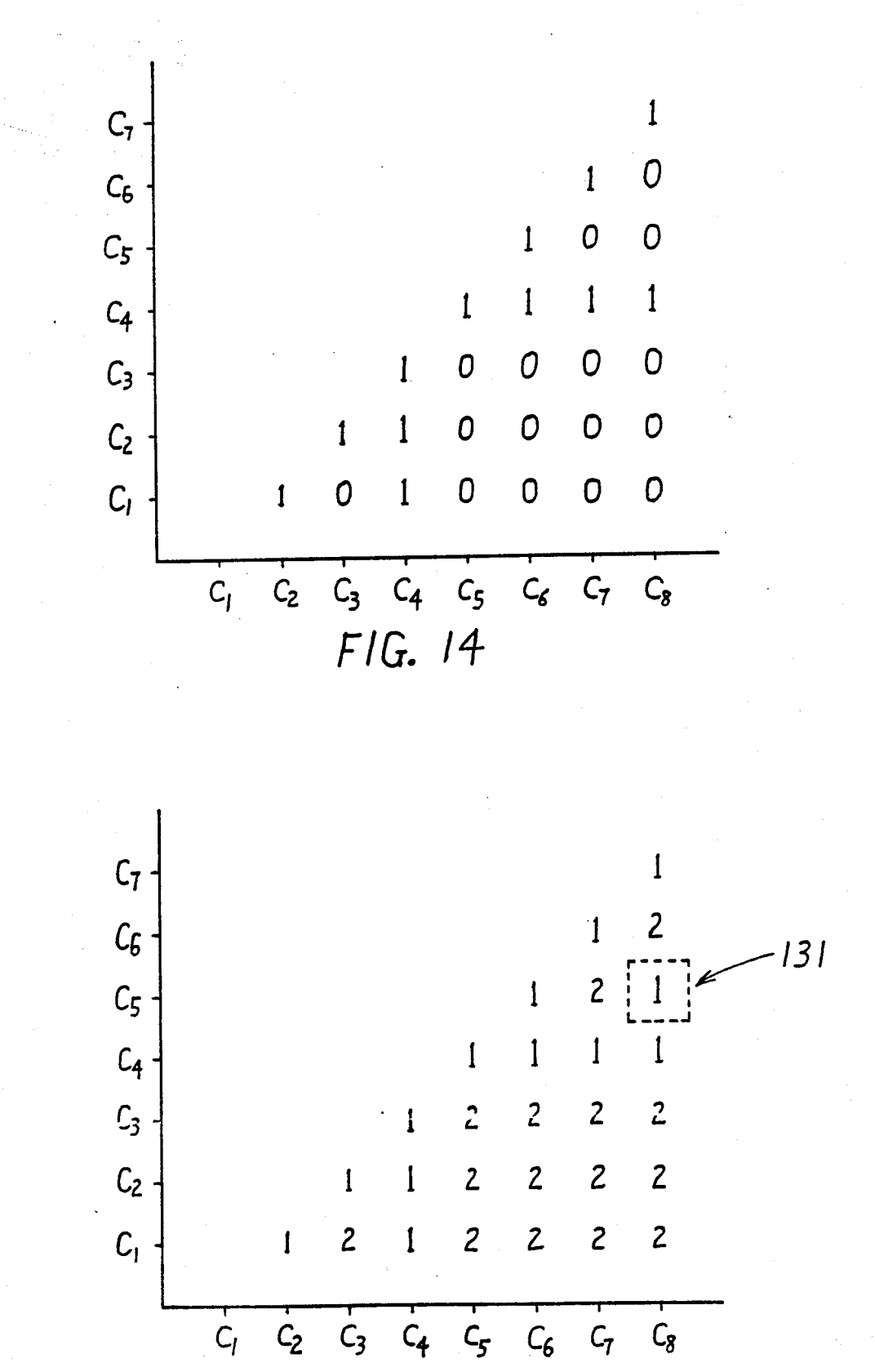

The flowchart of the algorithm for designing a switch network in accordance with the present invention is shown in FIG. 13. Block 201 is the starting point of the algorithm. Next (block 202) the constants of the design of a switch network are selected. The constants include the maximum number of bits, n, of the addends and the delay number d. Next, a P-model is constructed (block 203). The C-triangle associated with the S values selected in the following way by the designer is called a P model. The $S_{i,j}$ in a P model will be designated $P_{i,j}$. Each S value on the C-triangle is assigned, except the hypotenuse which is always 1. If it is decided to switch connect $C_i$ to $C_j$, then assign $S_{i,j}=1$. Otherwise, assign $S_{i,j}=0$. FIG. 14 depicts a P model on the C-triangle for n=8 and d=2.

Next, 0 is assigned to be the initial value of CTR (block 204), where CTR is the minimum number of control gates needed in the switch control 13 in FIG. 1. CTR is the minimum number of control gates since extra control gates may be needed where the inputs to AND gate 72 in FIG. 8 become impractically large due to the magnitude of the number n. Usually, the number of extra AND gates is small compared with the total number of gates of the adder. Next (block 205) the initial value of i=3 is assigned. Since $S_{2,1}=1$ and $S_{3,2}=1$, $S_{3,1}$ is the first S value in the algorithm which is selectable. Next (block 206) the value j=i−2 is assigned. Since $S_{i,i-1}=1$ for all i, each column begins with the point $(C_i, C_{i-2})$.

Next, the value of $P_{i,j}$ is checked (block 207). If $P_{i,j}=1$, then go to block 208 and assign $S_{i,j}=1$. This means that the switch previously selected on the P model is retained. If $P_{i,j}=0$, then go to block 211 where $S_{i,j}=\min(\{S_{k,j}+S_{i,k}|j<k<i\})$ is assigned. This assignment must be consistant with the value of $S_{i,j}$ according to its definition. Therefore, the value of $S_{i,j}$ by its definition = min $(\{S_{i,k}+S_{k,j}|j<k<i\})$ must be proved as follows. Suppose $S_{i,j}>\min(\{S_{i,k}+S_{k,j}|j<k<i\})$. Since j=i−2, therefore j<i−1<i, hence $\{S_{i,k}+S_{k,j}|j<k<i\}$ is a finite non-empty set. This means there exists m for which j<m<i. This implies there exists a minimum path Y from $C_j$ to $C_m$ and a minimum path Z from $C_m$ to $C_i$. The path Y connected with the path Z is a path from $C_j$ to $C_i$ passing through $C_m$. Then, $S_{i,j}>\min(\{S_{i,k}+S_{k,j}|j<k<i\})$ implies $S_{i,j}>$ the total number of switches on the path of Y connect with Z. This contradicts the definition of $S_{i,j}$. Therefore, the supposition $S_{i,j}>\min(\{S_{i,k}+S_{k,j}|j<k<i\})$ cannot be true.

Suppose: $S_{i,j}<\min(\{S_{i,k}+S_{k,j}|j<k<i\})$. Since j=i−2 and $C_j$ is not switch connected to $C_i$, therefore, as discussed above there exists m for which j<m<i and a minimum path Q from $C_j$ to $C_i$ passing through $C_m$. The supposition $S_{i,j}<\min(\{S_{i,k}+S_{k,j}|j<k<i\})$ implies $S_{i,j}<S_{i,m}+S_{m,j}$. Let $S_{i,j}=G+H$, where G=total number of switches from $C_m$ to $C_i$ in path Q, and H=total number of switches from $C_j$ to $C_m$ in path Q. That is, $G+H<S_{i,m}+S_{m,j}$. Then, either $G<S_{i,m}$ or $H<S_{m,j}$. With no loss of generality, assume $G<S_{i,m}$. But this means $S_{i,m}$ is not the minimum total number of switches in a path from $C_j$ to $C_m$. This contradicts the definition $S_{i,m}$. Therefore the supposition $S_{i,j}<\min(\{S_{i,k}+S_{k,j}|j<k<i\})$ is also not true. Therefore, the only possibility is that $S_{i,j}=\min(\{S_{i,k}+S_{k,j}|j<k<i\})$.

The comparison performed in block 212 checks the value. If $S_{i,j}\leq d$, then the value $S_{i,j}$ remains unchanged in which case $S_{i,j}$ is printed out. If $S_{i,j}>d$, the switch network determined by the P model will not satisfy the requirement that d be the largest number of switches allowed in all minimum paths. Consequently, a switch must be needed to connect $C_j$ and $C_i$. Therefore, assign $S_{i,j}=1$ (block 208). Whenever it is necessary to go to block 208, a new switch is always added to the switch network. Since j<i−2, the control of the new switch is always the output of an AND gate. Therefore, both of the numbers of control gates and switches must be increased by 1. These functions are represented by blocks 209 and 210. Next, the value of $S_{i,j}$ is printed out (block 213).

After the value $S_{i,j}$ has been determined and printed out, the value of j is decreased by 1 (block 214) to obtain the next S value; that is, $S_{i,j-1}$. Next, check if the algorithm has exhausted the whole column i of the C-triangle (block 215). If j>0, the whole column i has not been exhausted yet; consequently, an S value for the new j must be assigned (block 211). If j=0, the whole column i has been exhausted, and i is increased by 1 (block 216) in order to start the next column of the C-triangle. A check is then made to determine if the new column is the last column of the C-triangle (block 217). If i>n, the algorithm is completed (block 218). If i≦n, go to block 206 and repeat the algorithm for j=i−2 on the new column.

The usage of the above-described procedure is, in addition of the 1s of the P model, putting extra 1s on the C-triangle to fulfill the requirement that none of the S values on the C-triangle is greater than the delay number d. FIG. 15 shows all the S values on the C-triangle for the P model depicted in FIG. 14 and for the d=2, utilizing the above-described procedure. This figure represents the completion of the above-described procedure corresponding to the given P model. Block 131 in FIG. 15 contains the extra value 1 in addition of the P model in FIG. 14.

Figure 16:
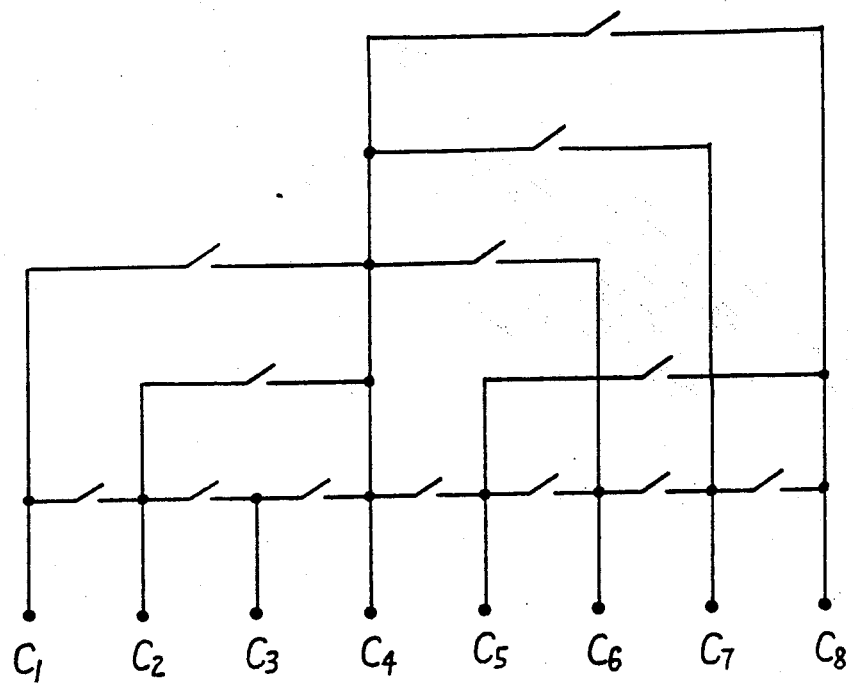
FIG. 16 is a schematic diagram of the switch network corresponding to the completed P model depicted in FIG. 15.

If, for some reason, the S value of a point on the C-triangle cannot be 1, but the decision of block 212 in FIG. 13 is YES, then the S values already been printed out need to be adjusted to avoid a yes decision in the block 212 comparison. For example, if the S value in block 131 of FIG. 15 cannot be 1, $S_{7,5}$ can be changed from the value 2 to value 1 and the value inside block 131 will be 2. This is the method to avoid putting switches between some carry nodes. Each proposed P model will save switches and control gates. But not each P model is necessarily the best model to be used to construct the switch network according to the above-described procedure. FIG. 16 is the circuit of the network expressed by FIG. 15.

A C-triangle with its assigned S values according to the above-described procedure can always be used to design the actual circuit and vice versa. The numbers at the various points on the C-triangle signify the minimum number of switches between the carry nodes corresponding to a particular point. The design method is that whenever there is an assigned value $S_{i,j}=1$ in a C-triangle, the actual circuit has a switch which switch connects the carry node $C_i$ with the carry node $C_j$ and vice versa. For example, $S_{4,2}=1$ and $S_{7,4}=1$ in FIG. 15, then $C_2$ switch connects to $C_4$ and $C_4$ switch connects to $C_7$ in FIG. 16. The S values in FIG. 15 which are not equal to 1 are the result of the algorithm depicted in FIG. 13 according to the switch connection shown in FIG. 16 as a P model. FIGS. 15 and 16 are methods which represent the same switch network but in different forms.

When n is large, there are many P models. The following is a description of an improved P model, hereinafter called a Transmitter-Receiver Model. The Transmitter-Receiver Model (hereinafter T-R Model) contains L levels. Each level is a sequence of subsets of the carry nodes set $\{C_1, C_2, \ldots, C_n\}$. In any case, the sequence of subsets in level 1 is always $\{C_1\}, \{C_2\}, \ldots, \{C_n\}$.

Assume level i has been constructed. The sequence of subsets is denoted by $Y_1, Y_2, \ldots, Y_k$. Also assume a sequence of integers, $0=r_0<r_1<r_2<\ldots<r_m=k$, called the grouping numbers of level i has been determined. Then, level i+1 will be constructed by defining:

$$H_t = \bigcup_{j=r_{t-1}+1}^{r_t} Y_j,$$

for t = 1, 1, ..., m.

$H_t$ is called the family of $Y_j$, and $Y_j$ is called the member of $H_t$, if $r_{t-1}<j\leq r_t$. The sequence of subsets of level i+1 will be $H_1, H_2, \ldots, H_m$. $H_1$ is called the first subset in level i+1. $H_m$ is called the last subset in level i+1. The determination of the grouping numbers will be discussed below.

For example, let n=8, and L=3. Hereinafter L denotes the total number of levels of a T-R Model. The following is an example of a 3 level T-R Model.
Level 3:
$\{C_1, C_2, C_3, C_4\}, \{C_5, C_6, C_7, C_8\}$
Level 2:
$\{C_1, C_2\}, \{C_3, C_4\}, \{C_5, C_6\}, \{C_7, C_8\}$
Level 1:
$\{C_1\}, \{C_2\}, \{C_3\}, \{C_4\}, \{C_5\}, \{C_6\}, \{C_7\}, \{C_8\}$
In level 1, the sequence of grouping number is $r_0=0$, $r_1=2, r_2=4, r_3=6, r_4=8$. Therefore level 2 has 4 subsets which are $H_1=\{C_1, C_2\}, H_2=\{C_3, C_4\}, H_3=\{C_5, C_6\}$, and $H_4=\{C_7, C_8\}$. In level 2, the sequence of grouping numbers is $r_0=0, r_1=2, r_2=4$. Therefore level 3 has 2 subsets which are $H_1=\{C_1, C_2, C_3, C_4\}$ and $H_2=\{C_5, C_6, C_7, C_8\}$. The first subset in each of level 1, level 2 and level 3 are $\{C_1\}, \{C_1, C_2\}$ and $\{C_1, C_2, C_3, C_4\}$ respectively. The last subset in each of level 1, level 2 and level 3 are $\{C_8\}, \{C_7, C_8\}$ and $\{C_5, C_6, C_7, C_8\}$ respectively.

Definition 8: A transmitter of a subset Y of $\{C_1, C_2, \ldots, C_n\}$ is an element in Y, other than $C_n$, with the largest subscript of all of the elements in Y. This transmitter is also called the last element of Y. A receiver of a subset Y of $\{C_1, C_2, \ldots, C_n\}$ is an element of Y, other than $C_1$, with the smallest subscript of all of the elements in Y. This receiver is also called the first element of Y. For example, the transmitter and receiver of the subset $\{C_3, C_4\}$ of $\{C_1, C_2, \ldots, C_8\}$ are $C_4$ and $C_3$ respectively.

Definition 9: Transmitter and receiver can be alternatively defined as follows: Denote the sequence of subsets of $\{C_1, C_2, \ldots, C_n\}$ in level i of a switch network by $Y_1, Y_2, \ldots, Y_k$. The transmitter of $Y_j$ is the first element of $Y_{j+1}$ for j=1, 2, ..., k−1. The receiver of $Y_j$ is the last element of $Y_{j-1}$ for j=2, 3, ..., k. For example, the transmitter and receiver of the subset $\{C_3, C_4\}$ of $\{C_1, C_2, \ldots, C_8\}$ in level 2 of the above example of a three level T-R model are $C_5$ and $C_2$ respectively. Note that definitions 8 and 9 do not define the receiver of the first subset and the transmitter of the last subset in each level.

The following are switch connection rules for the T-R model. First, in level 1, $C_i$ switch connects to $C_{i+1}$, for i=1, 2, ..., n−1. Second, the transmitter of a subset of level i switch connects to the transmitter of its family, for i=1, 2, ..., L−1. Where L is the total number of levels of the T-R Model. Third, the receiver of a subset of level i is switch connected to the receiver of all of its members, for i=2, 3, ..., L. Fourth, in level L, where the sequence of subsets of level L is denoted by $Y_1, Y_2, \ldots, Y_m$, the transmitter of the subset of $Y_i$ is switch connected to the receiver of subset $Y_j$ in level L, for all i<j, for i=1, 2, ..., m−1.

Definition 10: For a subset G in level i of a switch network, define G'=G{transmitter of G, receiver of G}. G' is called the reduced set of G. There are two different definitions, definition 8 and definition 9, of transmitter and receiver of a subset. Therefore, the reduced set of G depends upon which definition of transmitter and receiver is chosen. For example, let $\{C_1, C_2\}$, $\{C_3, C_4, C_5, C_6\}$, and $\{C_7, C_8\}$ be the sequence of subsets of level i of a switch network with n=8. Let G=$\{C_3, C_4, C_5, C_6\}$. If definition 8 is chosen, the transmitter and the receiver of G are $C_6$ and $C_3$ respectively, hence G'=$\{C_4, C_5\}$. If the transmitter of G is defined by definition 8 and the receiver of G is defined by definition 9, the transmitter and the receiver of G are $C_6$ and $C_2$ respectively, hence G'=$\{C_3, C_4, C_5\}$. G'=G=$\{C_3, C_4, C_5, C_6\}$ if the transmitter and the receiver of G defined by definition 9, since the transmitter and the receiver of G are $C_7$ and $C_2$ respectively.

The second, third and fourth switch Connection Rules didn't give a path from $C_j$ to $C_k$, j≠k; and $C_j$, $C_k$ belong to same reduced set of G, where G is a subset in level i of a switch network. A fifth Switch Connection Rule will give the method to supply such a path in G' to fulfill the predetermined delay number d. The fifth Switch Connection Rule is restricted on the reduced set of G because the second and third Switch Connection Rules supplied paths which fulfill the condition of delay number d between the transmitter, the receiver of G and each element of G. In accordance with the fifth Switch Connection Rule, let G'=$\{C_r, C_{r+1}, \ldots, C_s\}$. Consider G' as the carry node set of an Isolated Carry Propagation Fast Adder with s−r+1 bits. Then construct a T-R Model on G' according to the second, third and fourth Switch Connection Rules and delay number d. The switch connections of this T-R Model on G' are the switch connections needed on the T-R Model on $\{C_1, C_2, \ldots, C_n\}$. The fifth Switch Connection Rule can be applied repeatedly.

In accordance with the sixth Switch Connection Rule, the redundant switches are removed by applying the algorithm shown in FIG. 13. If a switch W is suspected as being redundant, delete this switch W from the T-R Model and consider it to be a P Model in the algorithm in FIG. 13. If the total number of 1s, except the value "1" which corresponds to switch W, in the completion of C-triangle before and after deleting the switch W are the same, then the switch W is redundant. Otherwise, it is not redundant.

Figure 17:
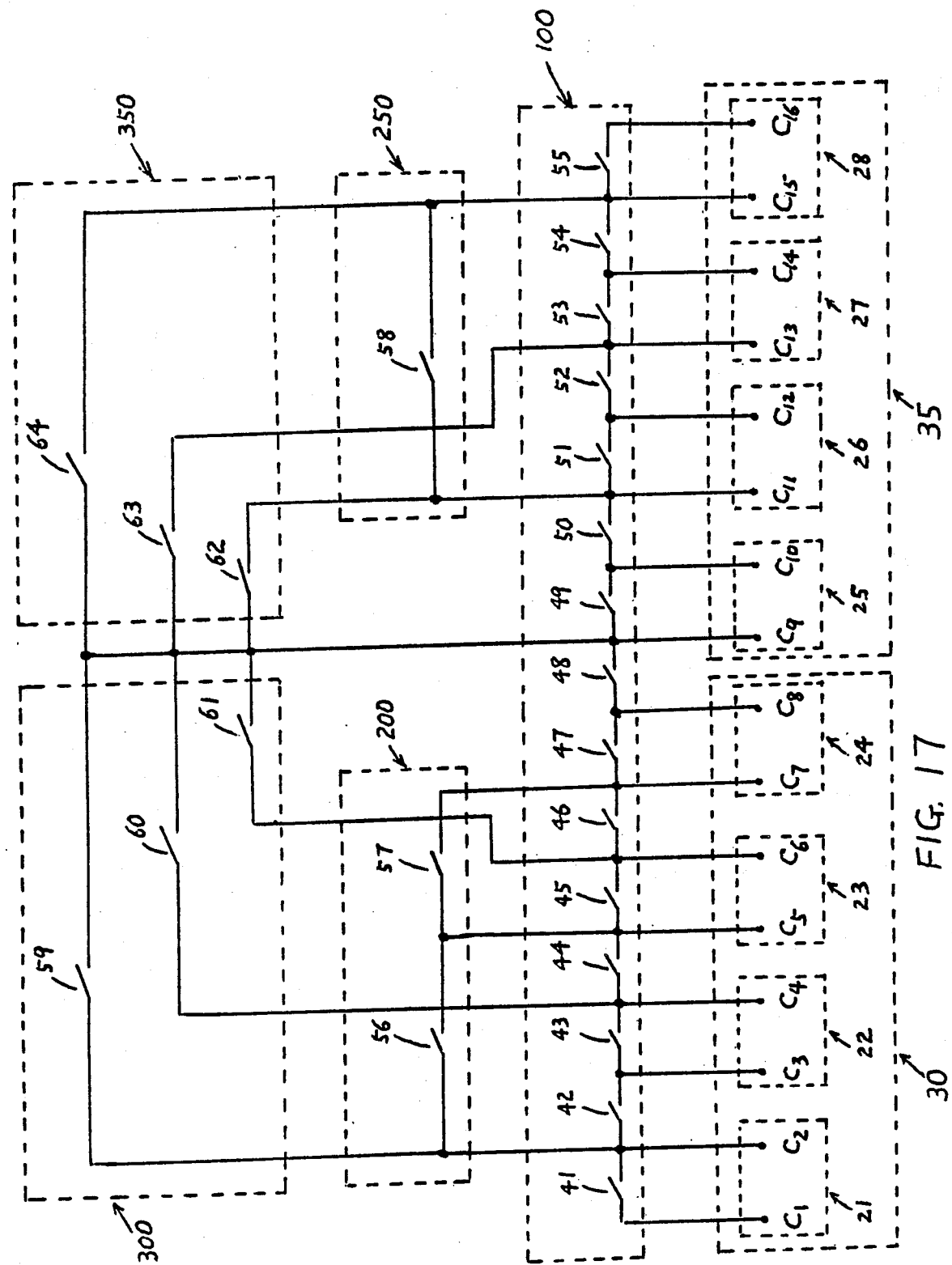
FIG. 17 is a schematic diagram of a T-R Model of a switch network illustrating advantages of alternate definitions of transmitter and receiver in accordance with the present invention.

For example, FIG. 17 depicts a switch network with n=16 and d=4. The carry node set is $\{C_1, C_2, \ldots, C_{16}\}$. The sequence of subsets in level 1 is $\{C_1\}$, $\{C_2\}$, $\{C_3\}, \ldots, \{C_{16}\}$. Choosing the grouping numbers of level 1 be 0, 2, 4, 6, 8, 10, 12, 14, and 16, according to the definition of the family of subsets in level i shown by the formula for $H_t$, the sequence of subsets in level 2 will be $\{C_1, C_2\}$, $\{C_3, C_4\}$, $\{C_5, C_6\}$, $\{C_7, C_8\}$, $\{C_9, C_{10}\}$, $\{C_{11}, C_{12}\}$, $\{C_{13}, C_{14}\}$, $\{C_{15}, C_{16}\}$ as shown in blocks 21, 22, 23, 24, 25, 26, 27 and 28. Choosing the grouping numbers of level 2 be 0, 4 and 8, and according to the formula defining $H_t$ again, the sequence of subsets in level 3 will be $\{C_1, C_2, C_3, C_4, C_5, C_6, C_7, C_8\}$, $\{C_9, C_{10}, C_{11}, C_{12}, C_{13}, C_{14}, C_{15}, C_{16}\}$ as shown in blocks 30 and 35.

The advantage of the alternative definition of transmitter and receiver will be clear in the following discussion made in connection with FIG. 17. By definition 8, the transmitters of subsets in level 2 shown in blocks 21, 22, 23, 24, 25, 26, 27 are $C_2, C_4, C_6, C_8, C_{10}, C_{12}$ and $C_{14}$ respectively. By definition 8, the receivers of subsets in level 2 shown in blocks 22, 23, 24, 25, 26, 27, 28 are $C_3, C_5, C_7, C_9, C_{11}, C_{13}$ and $C_{15}$ respectively. By definition 9, the transmitter of the subset in level 3 shown in block 30 is $C_9$. By definition 8 again, the receiver of the subset in level 3 shown in block 35 is also $C_9$. Level 3 has only two subsets. The transmitter of the first subset is the receiver of the second subset. Therefore, no switch connection is needed between the subsets in level 3.

According to the first Switch Connection Rule, the switches are shown in block 100. Carry node $C_1$ is switch connected to carry node $C_2$ through switch 41. $C_2$ is switch connected to $C_3$ through switch 42. $C_3$ is switch connected to $C_4$ through switch 43. $C_4$ is switch connected to $C_5$ through switch 44. $C_5$ is switch connected to $C_6$ through switch 45. $C_6$ is switch connected to $C_7$ through switch 46. $C_7$ is switch connected to $C_8$ through switch 47. $C_8$ is switch connected to $C_9$ through switch 48. $C_9$ is switch connected to $C_{10}$ through switch 49. $C_{10}$ is switch connected to $C_{11}$ through switch 50. $C_{11}$ is switch connected to $C_{12}$ through switch 51. $C_{12}$ is switch connected to $C_{13}$ through switch 52. $C_{13}$ is switch connected to $C_{14}$ through switch 53. $C_{14}$ is switch connected to $C_{15}$ through switch 54. $C_{15}$ is switch connected to $C_{16}$ through switch 55.

According to the second Switch Connection Rule, the switches are shown in block 300. The transmitter carry node $C_2$ is switch connected to the transmitter of the first subset in level 3, carry node $C_9$, through switch 59. The transmitter $C_4$ is switch connected to $C_9$ through switch 60. The transmitter $C_6$ is switch connected to $C_9$ through switch 61. The transmitter $C_8$ is switch connected to $C_9$ through switch 48 as described above.

According to the third Switch Connection Rule, the switches are shown in block 350. As previously discussed, the receiver of the last subset in level 3 is carry node $C_9$. $C_9$ is switch connected to the receiver $C_{11}$ through switch 62. $C_9$ is switch connected to the receiver $C_{13}$ through switch 63. $C_9$ is switch connected to the receiver $C_{15}$ through switch 64.

Figure 18:
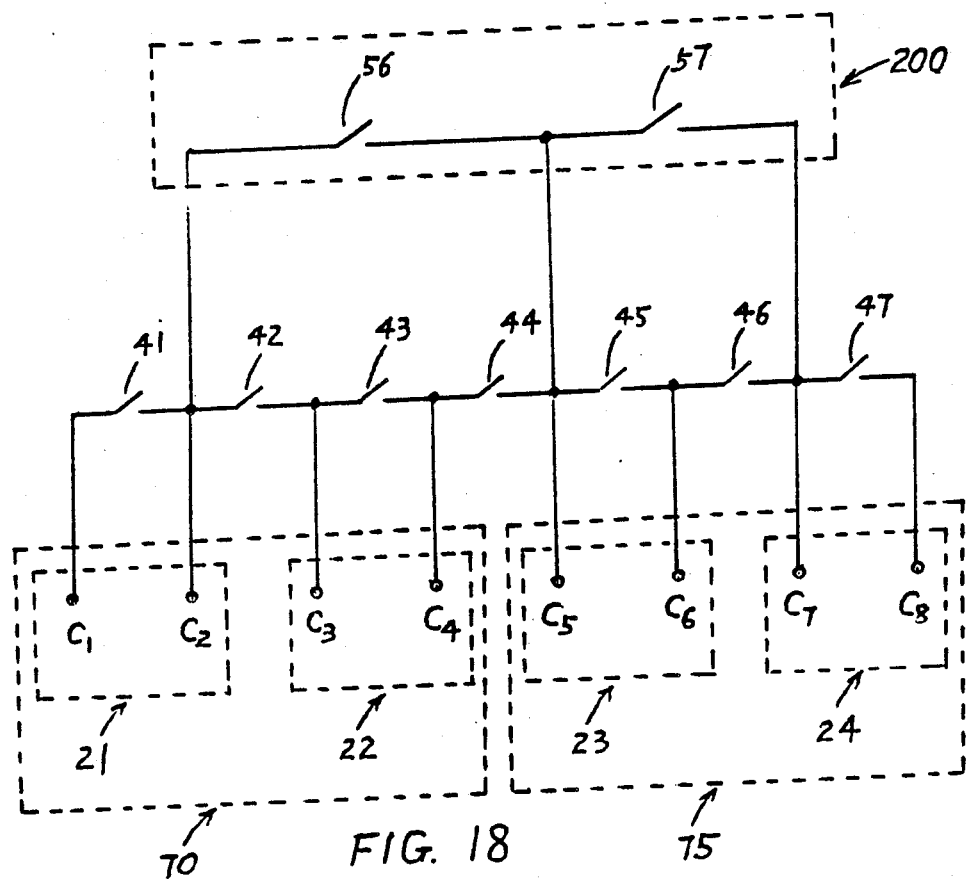
FIG. 18 is a schematic diagram of the reduced set $\{C_1, C_2, \ldots, C_8\}$ of block 30 of FIG. 17, depicting the application of Switch Connection Rule 5.

The first, second and third Switch Connection Rules give the path from any carry node in block 30 to any carry node in block 35 with delay number d equal to 4. What are the paths with d=4 between any two carry nodes in block 30 or block 35? Consider carry nodes in block 30 of FIG. 17, the reduced set of this subset is itself, as a carry node set. FIG. 18 depicts the switch network of this carry node set $\{C_1, C_2, C_3, C_4, C_5, C_6, C_7, C_8\}$. The structure of level 1 and level 2 are hereditary from the structure of level 1 and level 2 in FIG. 17. Choosing the grouping numbers in level 2 of FIG. 18 be 0, 2 and 4, according to the formula defining $H_t$, the sequence of subsets of $\{C_1, C_2, \ldots, C_8\}$ is $\{C_1, C_2, C_3, C_4\}$, $\{C_5, C_6, C_7, C_8\}$ as shown in blocks 70 and 75 in FIG. 18.

Using definition 8, the transmitters of the subsets $\{C_1, C_2\}$, $\{C_3, C_4\}$, and $\{C_5, C_6\}$ are $C_2, C_4$ and $C_6$ respectively; the receiver of the subsets $\{C_3, C_4\}$, $\{C_5, C_6\}$, $\{C_7, C_8\}$ and $\{C_5, C_6, C_7, C_8\}$ are $C_3, C_5, C_7$ and $C_5$ respectively. Using definition 9, the transmitter of $\{C_1, C_2, C_3, C_4\}$ is $C_5$. There is no switch connection needed between the subsets in level 3, since the transmitter of $\{C_1, C_2, C_3, C_4\}$ is the receiver of $\{C_5, C_6, C_7, C_8\}$. According to the second Switch Connection Rule, the transmitter $C_2$ is switch connected to the transmitter $C_5$ through switch 56. According to the third Switch Connection Rule, the receiver $C_5$ is switch connected to the receiver $C_7$ through switch 57. Block 200 in FIG. 18 is the same block 200 in FIG. 17. The receiver of the subset in block 35 of FIG. 17 is $C_9$. Therefore, its reduced set is $\{C_{10}, C_{11}, C_{12}, C_{13}, C_{14}, C_{15}, C_{16}\}$.

Figure 19:
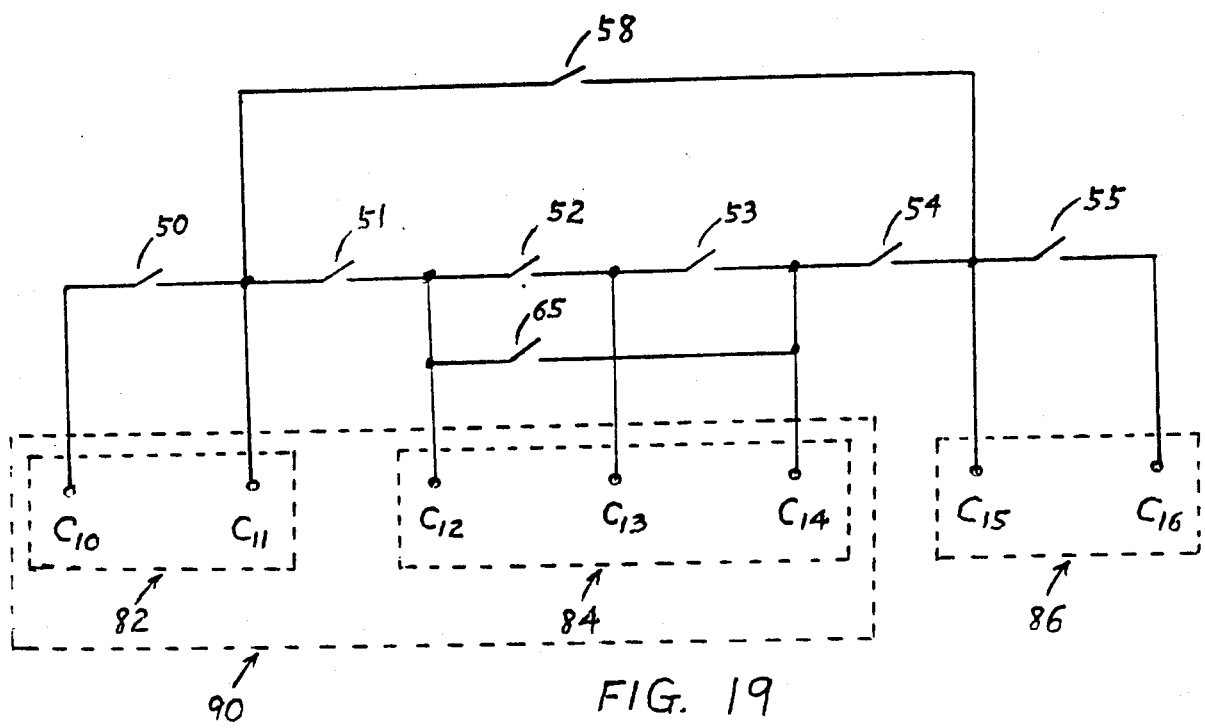
FIG. 19 is a schematic diagram of the reduced set $\{C_{10}, C_{11}, C_{12}, C_{13}, C_{14}, C_{15}, C_{16}\}$ of block 35 in FIG. 17, depicting the application of Switch Connection Rules 5 and 6.

FIG. 19 depicts the switch network of $\{C_{10}, C_{11}, C_{12}, C_{13}, C_{14}, C_{15}, C_{16}\}$. The sequence of subsets in level 2 is $\{C_{10}, C_{11}\}$, $\{C_{12}, C_{13}, C_{14}\}$, and $\{C_{15}, C_{16}\}$. The transmitter of $\{C_{10}, C_{11}\}$ is $C_{11}$. The transmitter and receiver of $\{C_{12}, C_{13}, C_{14}\}$ are $C_{14}$ and $C_{12}$ respectively. The sequence of subsets in level 3 is $\{C_{10}, C_{11}, C_{12}, C_{13}, C_{14}\}$ and $\{C_{15}, C_{16}\}$. The transmitter of $\{C_{10}, C_{11}, C_{12}, C_{13}, C_{14}\}$ is $C_{15}$. The receiver of $\{C_{15}, C_{16}\}$ both in level 2 and level 3, is $C_{15}$. According to the Switch Connection Rules, the switch connections are shown in FIG. 19. Switch 65 is redundant since from $C_{12}$ to each of $C_{13}$, $C_{14}$, $C_{15}$, $C_{16}$ there are at most four switches 52, 53, 54 and 55, which satisfies the criteria d=4. By FIG. 19, we get the switch 58 in block 250 of FIG. 17. The completion of the C-triangle of this example using the T-R Model shown in FIG. 17 as the P Model, is shown in FIG. 20.

The delay number and the number of levels of a T-R Model has the relation

| | |
|---|---|
| d = 2(L − 1), | for d even |
| d = 2(L − 1) + 1, | for d odd |

According to the second Switch Connection Rule, starting from a carry node $C_i$ in level 1 the carry signal on $C_i$ can reach a transmitter $C_j$ of a subset in level L by going through L−1 switches. According to the third Switch Connection Rule, starting from a receiver $C_k$ of a subset in level L the carry signal on $C_k$ can reach carry node $C_m$ in level 1 by going through L−1 switches. If there is no switch connection needed between the transmitter and receiver in the highest level, level L, the delay number will be even and $(L-1)+(L-1)=2(L-1)$ as shown by the above formula for d even. The example described with respect to FIG. 17 is the case of d=4, L=3. If switch connection is needed between the transmitter and the receiver in the highest level, one more switch is needed according to the fourth Switch Connection Rule. Therefore, $d=2(L-1)+1$, as shown by the formula above for d odd.

In designing a T-R Model, the designer should first decide the delay number d, then find the total number of levels L by utilizing the above formulae depending upon whether d is even or odd. There is no restriction on the values of grouping number, but it will be better to keep it as close as arithmetical progressions with the same common differences. FIG. 20 depicts the completion of the algorithm shown in FIG. 13 corresponding to the schmatic diagram of the T-R Model in FIG. 17.

The control of a switch in the switch network 12 in FIG. 1 was explained in the description of FIG. 8. If the total number of inputs to the control AND gates becomes very large, additional control AND gates can be added to decrease the total number of inputs of control AND gates in switch control 13 of adder 10 of FIG. 1, since the size of an AND gate is proportional to the number of its inputs. For example, the switch control AND gates which control switches in block 515 of FIG. 21 will be shown in FIG. 23. The output of the two input AND gate 41 in FIG. 23 controls switch 73 in block 515 of FIG. 21. The output of the three input AND gate 42 in FIG. 23 controls switch 74 in block 515 of FIG. 21. The output of the four input AND gate 43 in FIG. 23 controls switch 75 in block 515 of FIG. 21. The output of the five input AND gate 44 in FIG. 23 controls switch 76 in block 515 of FIG. 21. The output of the six input AND gate 45 in FIG. 23 controls switch 77 in block 515 of FIG. 21. The output of the seven input AND gate 46 in FIG. 23 controls switch 78 in block 515 of FIG. 21. The total number of inputs of AND gates 41, 42, 43, 44, 45 and 46 is $2+3+4+5+6+7=27$.

Figure 23:
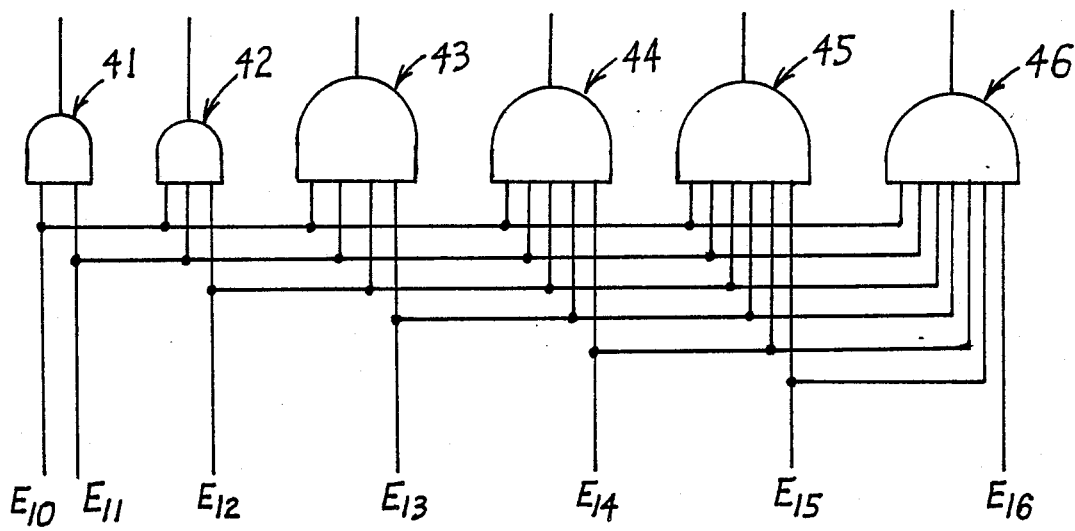
FIG. 23 is a schematic diagram of switch control AND gates which control switches in block 515 of FIG. 21.
Figure 24:
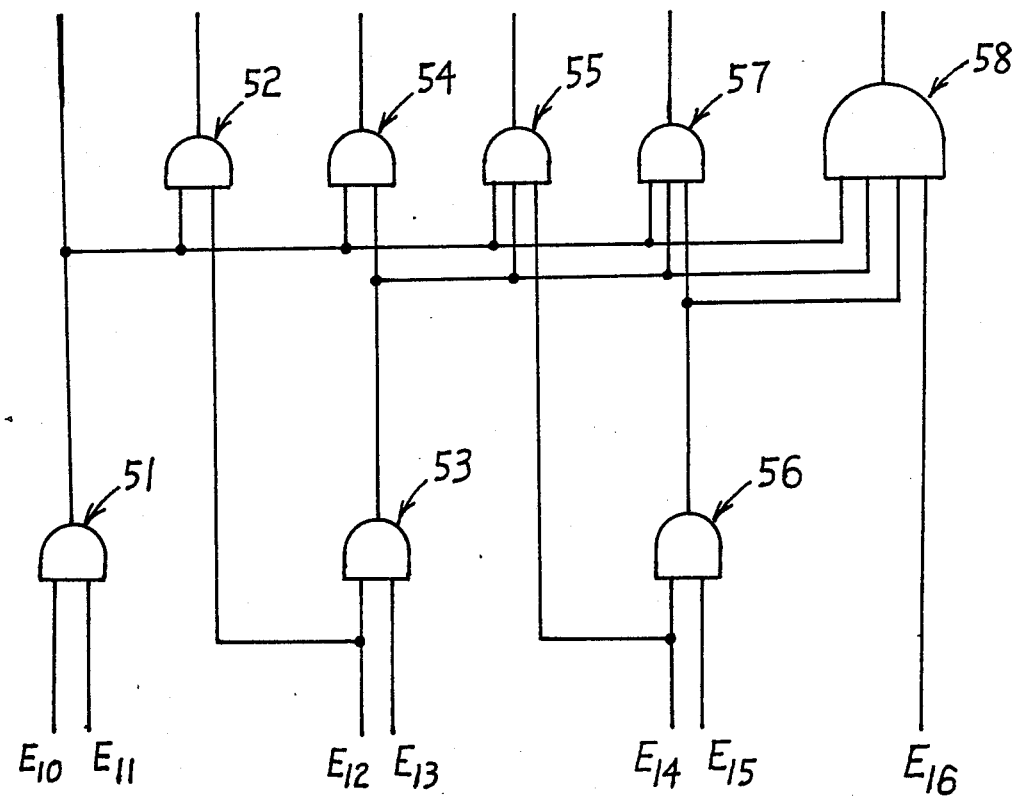
FIG. 24 is a modified schematic diagram of switch control AND gates of FIG. 23.

FIG. 24 is the modified switch control in FIG. 23. Partition all the inputs of control AND gates in FIG. 23, $E_{10}$, $E_{11}$, $E_{12}$, $E_{13}$, $E_{14}$, $E_{15}$ and $E_{16}$, into four groups. The first group $E_{10}$ and $E_{11}$ are the inputs of AND gate 51 in FIG. 24. The second group $E_{12}$ and $E_{13}$ are the inputs of AND gate 53 in FIG. 24. The third group $E_{14}$ and $E_{15}$ are the inputs of AND gate 56 in FIG. 24. The fourth group $E_{16}$ is one of the inputs of AND gate 58 in FIG. 24. The output of AND gate 51 is one of the inputs of AND gates 52, 54, 55, 57 and 58. The output of AND gate 53 is one of the inputs of AND gates 54, 55, 57 and 58. The output of AND gate 56 is one of the inputs of AND gates 57 and 58.

Figure 21:
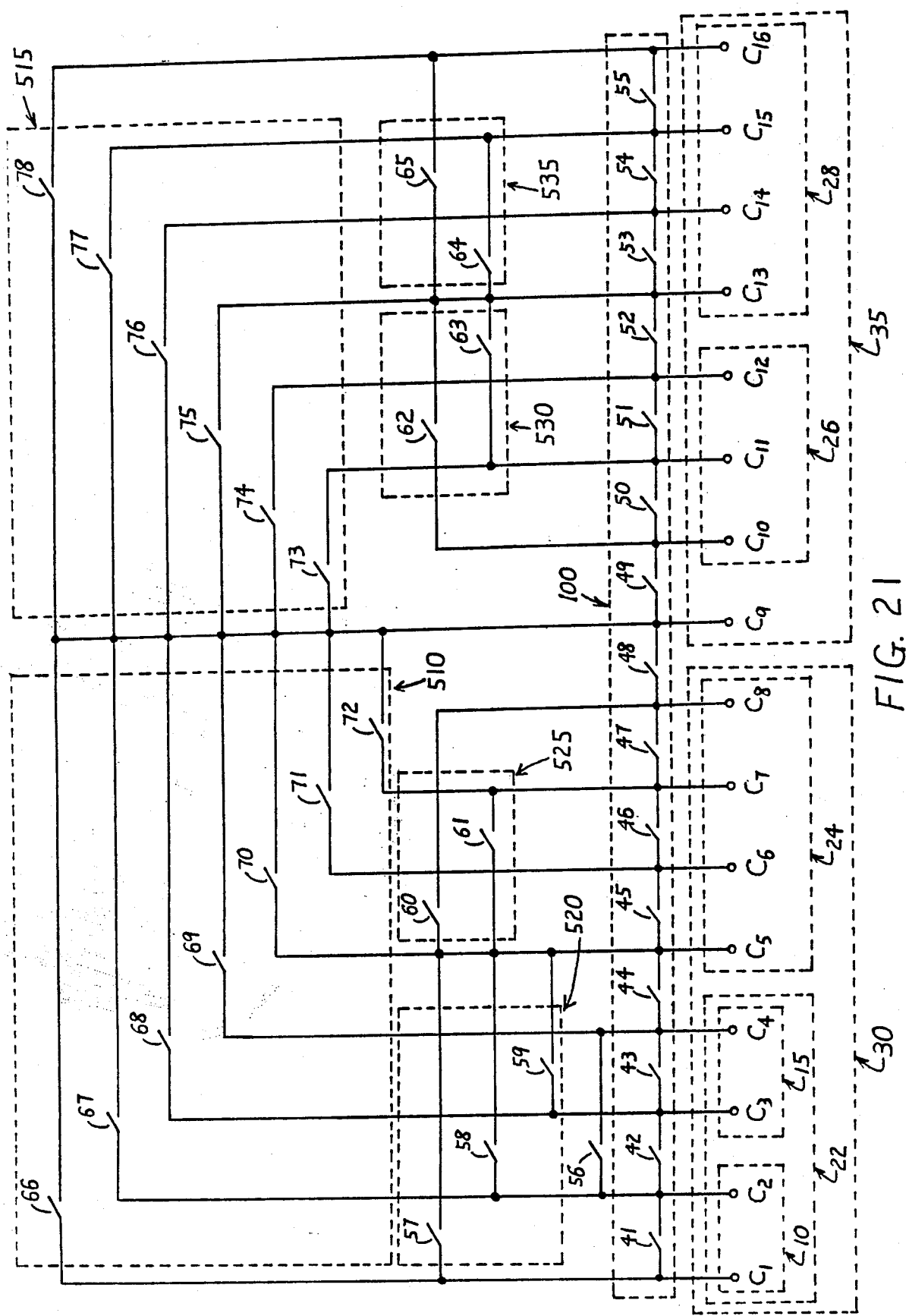
FIG. 21 is a schematic diagram of a T-R Model of a two level switch network for a sixteen bit adder having a delay number of 2 in accordance with the present invention.

The output of the two input AND gate 51 in FIG. 24 controls switch 73 in block 515 in FIG. 21. The output of the two input AND gate 52 in FIG. 24 control switch 74 in block 515 in FIG. 21. The output of the two input AND gate 54 in FIG. 24 control switch 75 in block 515 in FIG. 21. The output of the three input AND gate 55 in FIG. 24 control switch 76 in block 515 in FIG. 21. The output of the three input AND gate 57 in FIG. 24 controls switch 77 in block 515 in FIG. 21. The output of the four input AND gate 58 in FIG. 24 controls switch 78 in block 515 in FIG. 21.

The total number of inputs of AND gates 51, 52, 53, 54, 55, 56, 57 and 58 is $2+2+2+2+3+2+3+4+=20$ which is less than 27. The disadvantage of the method shown in FIG. 24 is that the control signal is one more gate delay compared with that in FIG. 23. Therefore, the designer should consider the relation between the speed of the carry signal and the speed of the switch control signal to avoid the situation where the carry signal arrives at a switch before the control signal arrives at that switch.

The previous description of different embodiments of the ith cell 20, first cell 14, and the adder base 11 of the adder 10 depicted in FIG. 1 are specific ones. The following definitions will be very helpful in the descriptions of more general form of a cell, the adder base 11 of the adder 10 depicted in FIG. 1 and the detail explanation of the reason why this invention is better than the typical look ahead adder.

Definition 11: A switch 70 as depicted in FIG. 8 is called a Type One switch if a logical "1" signal applied to the control input will cause the switch to close while a logical "0" applied to the control input causes the switch to open.

Definition 12: A switch 70 as depicted in FIG. 8 is called a Type Zero switch if a logical "0" signal applied to the control input will cause the switch to close while a logical "1" signal applied to the control input causes the switch to open.

Definition 13: An ith universal cell is an electronic digital circuit. Its input are $A_i$, $B_i$, and $C_{i-1}$. Its outputs are $E_i$, $\Sigma_i$ and $C_i$. The inputs and outputs truth table is:

| $A_i$ | $B_i$ | $C_{i-1}$ | $E_i$ | $\Sigma_i$ | $C_i$ |
|---|---|---|---|---|---|
| 0 | 0 | 0 | 0 | 0 | 0 |
| 0 | 0 | 1 | 0 | 1 | 0 |
| 0 | 1 | 0 | 1 | 1 | X |
| 0 | 1 | 1 | 1 | 0 | X |
| 1 | 0 | 0 | 1 | 1 | X |
| 1 | 0 | 1 | 1 | 0 | X |
| 1 | 1 | 0 | 0 | 0 | 1 |
| 1 | 1 | 1 | 0 | 1 | 1 |

Where $A_i$ and $B_i$ are the ith bits of the addends A and B respectively for $i=1, 2, \ldots, n$, where n equals the number of binary bits in each of the addends A and B. $C_n$ denote the overflow of the adder. $\Sigma_i$ is the sum of $A_i + B_i + C_{i-1}$. $C_{i-1}$ and $C_i$ are the input and output carries of the ith universal cell respectively. There is no 0th universal cell. $C_0$ is the input carry of the first universal cell. The logical value of $C_0$ is always equal to "0". X indicates that $C_i$ is electrically isolated from all the other nodes of this ith universal cell. For arbitrary $i > 0$, an ith universal cell is called a universal cell.

According to definition 13, each of the ith cells 20 depicted in FIGS. 2, 4 and 6 is an ith universal cell. The previous detailed description of the operation of ith cells 20 depicted in FIGS. 2, 4 and 6, the operation of the first cells 14 depicted in FIGS. 3, 5 and 7, and the five bit adder in accordance with the present invention depicted in FIG. 9 all depend upon the truth table in definition 13. Since $C_0 = 0$, the first universal cell is functionally equivalent to the first cells depicted in FIGS. 3, 5 and 7. If ground be the input carry and the node $\Sigma_1$ be the node $E_1$, the first cells depicted in FIGS. 3, 5 and 7 can be considered to be the first universal cells. Furthermore, the ith and jth universal cells have the same definition for $i \neq 1$ and $j \neq 1$. The only difference between the first universal cell and the ith universal cell, $i \neq 1$, is $C_0 = 0$ while $C_i$ depend upon the addends A and B. Therefore, any universal cell can be used as the ith cell in the adder base 11 of adder 10 depicted in FIG. 1 for any positive integer i. Remember that when a universal cell is used as the first cell in the adder base 11 of the adder 10 depicted in FIG. 1, its input carry must be connected to ground; that is, $C_0 = 0$.

All the previous descriptions of the adder of this invention have been made considering the adder to be a whole entity. In practice, it is more flexible to make blocks of m bits which can be connected in cascade to form an adder of rm bits, where r is a positive integer.

Figure 25:
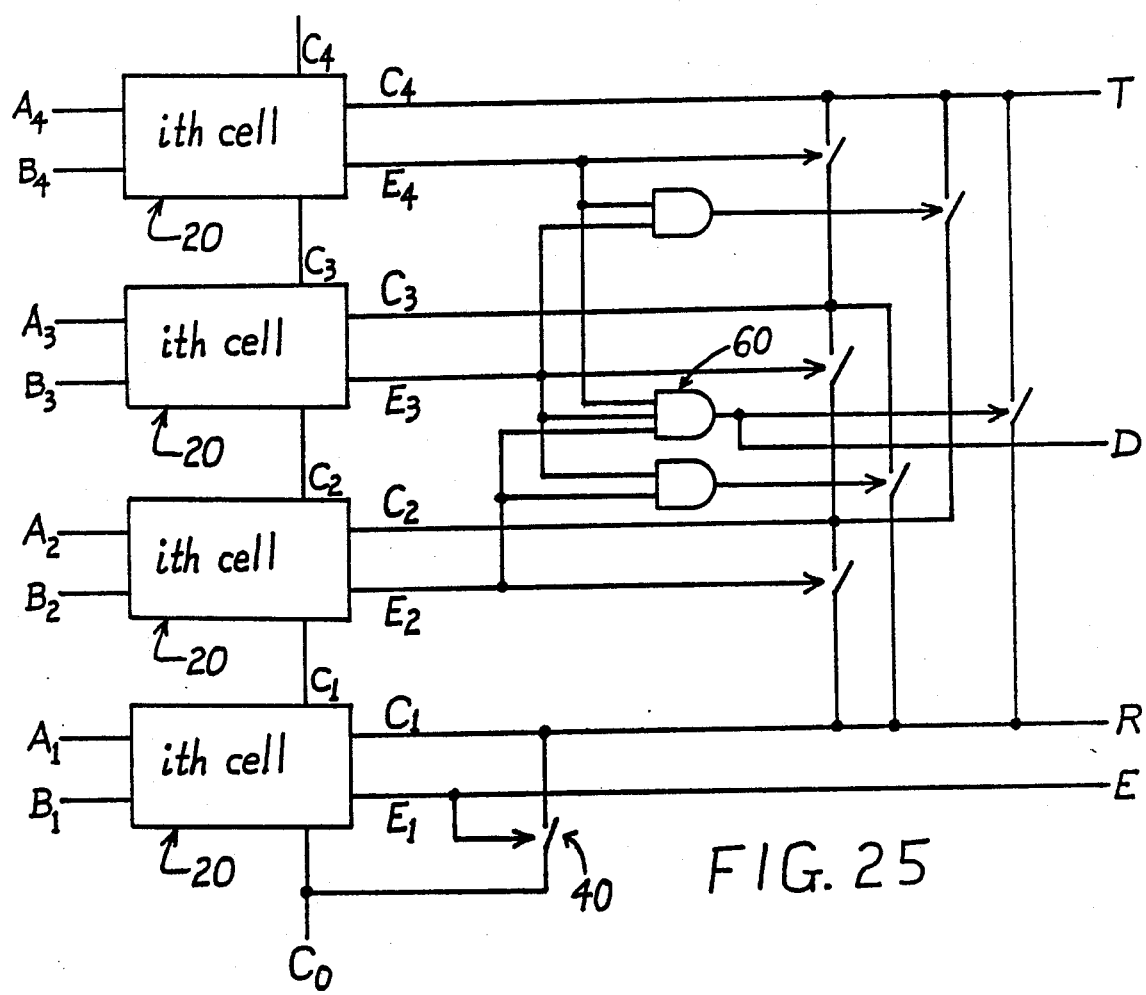
FIG. 25 is a schematic diagram of a 4 bit B-block of this invention used in cascade connection for construction of a large Isolated Carry Propagation Fast Adder.

Referring now to FIG. 25, there is shown a four bit type B block, hereinafter B-block. Each of the ith cells 20 is a universal cell. The circuit depicted in FIG. 25 is a four bit Isolated Carry Propagation Fast Adder with delay number $d=1$; however the B-block depicted in FIG. 25 has more features than a four bit Isolated Carry Propagation Fast Adder with delay number $d=1$. These extra features are: The first universal cell (the cell with $A_1$, $B_1$ and $C_0$ as its inputs) has output an $E_1$ which is coupled to a control input of a Type One switch 40. The inputs of the B-block are carry $C_0$ and the bits of addends $A_1, B_1, A_2, B_2, A_3, B_3, A_4, B_4$. The outputs of the B-block are carry $C_4$ and nodes T, D, R and E.

Node T is connected to the carry node $C_4$. "T" means the transmitter (definition 8). Node R is connected to the carry node $C_1$. "R" means the receiver (definition 8). Node E is connected to the node $E_1$. Node D is connected to an ouput of three-input AND gate 60. Whenever the node D is used as a control input, it is equivalent to using $E_2$, $E_3$ and $E_4$ as control inputs, since the inputs of the AND gate 60 are $E_2$, $E_3$ and $E_4$. Nodes D and E will be coupled to a P-block to control the switches in the P-block. Whenever a maximum C-sequence W with $C_1$ as its first term occurs, $E_1$ will be "1" and switch 40 will be closed. The carry signal $C_0$ will be sent to carry node $C_1$ and thereby to each carry node in W.

Figure 26:
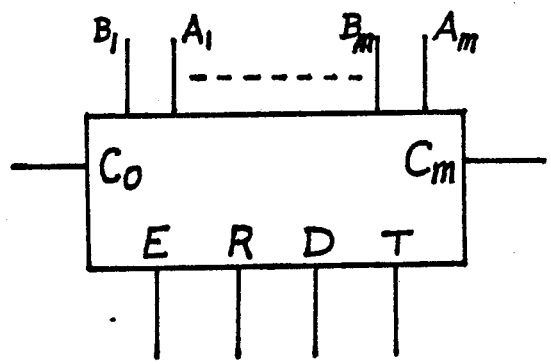
FIG. 26 is a block diagram of an m bit B-block.

Referring now to FIG. 26, there is shown a general block diagram of B-block. The inputs of the B-block are input carry $C_0$ and m pairs of binary bits of the addends A and B, $(A_1, B_1), \ldots, (A_m, B_m)$. The outputs of the B-block are the output carry node $C_m$ and four output nodes T, D, R and E, as described in the description of FIG. 25.

Figure 27:
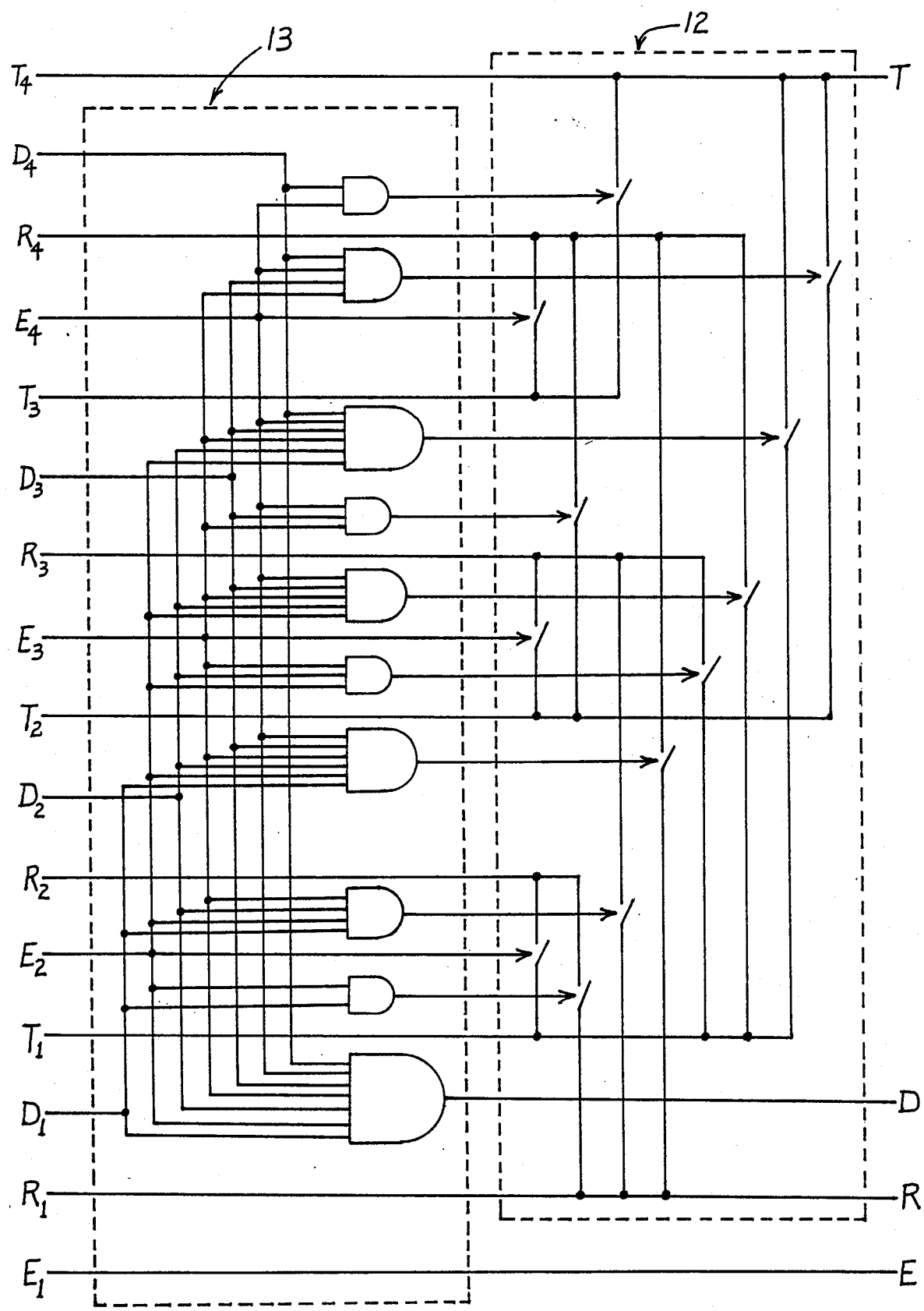
FIG. 27 is a schematic diagram of a P-block of this invention used in cascade connection for construction of a large Isolated Carry Propagation Fast Adder.

Referring now to FIG. 27, there is shown a type P block, hereinafter P-block. The inputs of the P block are four sets of nodes T, D, R and E from the four output nodes of four B-blocks, $E_1, R_1, D_1, T_1, E_2, R_2, D_2, T_2, E_3, R_3, D_3, T_3, E_4, R_4, D_4, T_4$. The P-block depicted in FIG. 27 is the switch network and switch control. The inputs $R_1, T_1, R_2, T_2, R_3, T_3, R_4, T_4$, are the input carry nodes of the switch network 12 of FIG. 27. The inputs $E_1, D_1, E_2, D_2, E_3, D_3, E_4, D_4$ are the inputs of the switch control 13 of FIG. 27. The outputs of the P-block are also the four nodes T, D, R and E. Recalling the T-R Model, the P-block depicted in FIG. 27 is a part of a T-R Model described as follows: $\{R_1, T_1\}$, $\{R_2, T_2\}$, $\{R_3, T_3\}$, $\{R_4, T_4\}$ which is a consecutive part of the sequence of subsets of a carry node set of level j, $j > 1$.

Each $R_i$, $i = 1, 2, 3$ and 4 is a receiver. Each $T_i$, $i = 1, 2, 3$ and 4 is a transmitter. $\{R_1, T_1\}$ is not the first subset of level j, since first subset can not have a receiver. $\{R_4, T_4\}$ is not the last subset of level j, since last subset cannot have a transmitter. $\{R_1, T_1, R_2, T_2, R_3, T_3, R_4, T_4\}$ is the family of the subsets $\{R_1, T_1\}, \{R_2, T_2\}, \{R_3, T_3\}, \{R_4, T_4\}$. Choose $R_1$ as the receiver of the family according to definition 8. Choose $T_4$ as the transmitter of the family according to definition 8. The nodes input to switch control 13 depicted in FIG. 27 are $E_1, D_1, E_2, D_2, E_3, D_3, E_4, D_4$. The switch connections in switch network 12 depicted in FIG. 27 are made according to switch connection rules 2, 3 and 4.

Figure 28:
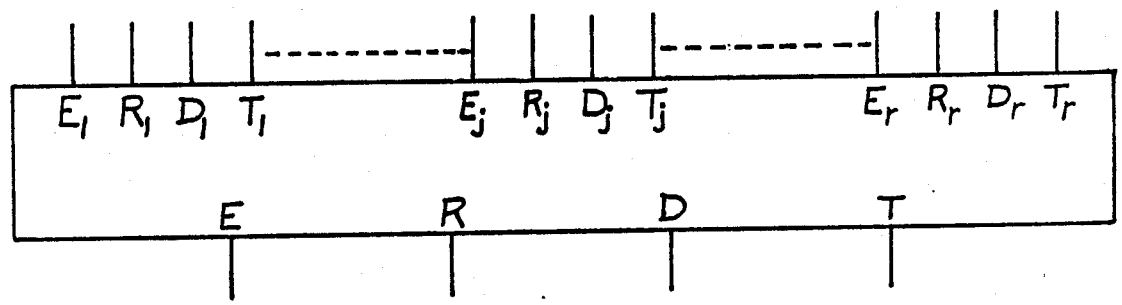
FIG. 28 is a block diagram of an rm bit P-block.

Referring now to FIG. 28, there is shown a general block diagram of a P-block. The inputs of the P-block are r sets of nodes T, D, R and E which are the outputs of r B-blocks or P-blocks. As described in the description of FIG. 27, the outputs of the general P-block are also the nodes T, D, R and E. The number of the input bits of B-block, m, and the number r may or may not be equal.

Figure 29:
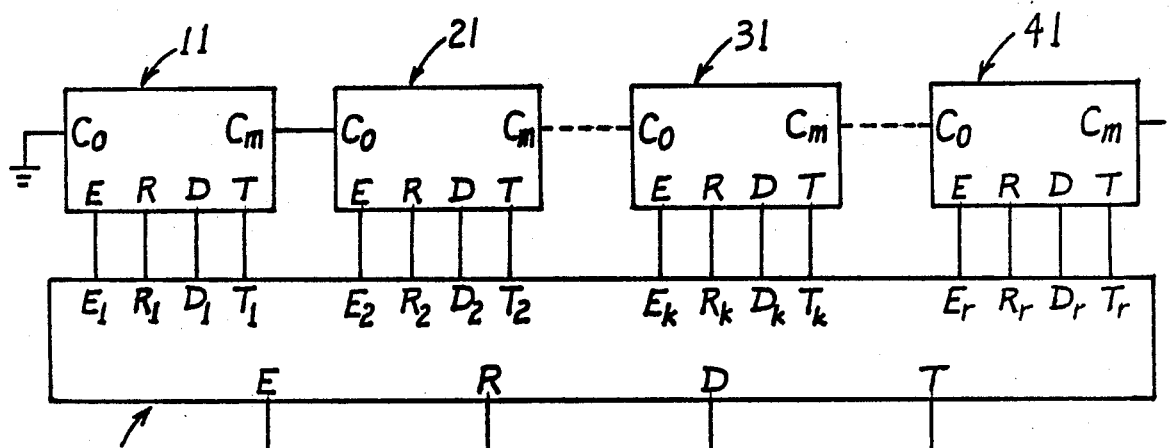
FIG. 29 is a two level cascade connection of r B-blocks and a P-block of an rm bit Isolated Carry Propagation Fast Adder.

Referring now to FIG. 29, there is shown a two level cascade connection of an rm bit Isolated Carry Propagation Fast Adder. A B-block 11 with m pair of input bits is the first B-block. Its output nodes T, D, R and E are connected to the nodes $T_1, D_1, R_1$ and $E_1$ of a P-block 101 respectively. A B-block 21 with m pair of input bits is the second B-block. Its ouput nodes T, D, R and E are connected to the nodes $T_2, D_2, R_2$ and $E_2$ of the P-block 101 respectively. A B-block 31 with m pair of input bits is the kth B-block. Its output nodes T, D, R and E are connected to the nodes $T_k, D_k, R_k$ and $E_k$ of the P-block 101 respectively. A B-block 41 with m pair of input bits is the rth B-block. Its output nodes T, D, R and E are connected to the nodes $T_r, D_r, R_r$ and $E_r$ of the P-block 101 respectively.

An input carry node $C_0$ of the first B-block 11 depicted in FIG. 29 is connected to ground as previously described. An output carry node $C_m$ of the first B-block 11 is connected to an input carry node $C_0$ of the second B-block 21. An output carry node $C_m$ of the second B-block 21 will be connected to an input carry node $C_0$ of the third B-block. An output carry node $C_m$ of the $(k-1)$th B-block will be connected to an input carry node $C_0$ of the kth B-block. An output carry node $C_m$ of the kth B-block will be connected to an input carry node $C_0$ of the $(k+1)$th B-block. An output carry node $C_m$ of the $(r-1)$th B-block will be connected to an input carry node $C_0$ of the rth B-block. An output carry node of the rth B-block will denote the overflow of the addition of two rm bit addends. The relation between the ith B-block and the binary bits of the addends A and B is that $A_{(i-1)m+1}$, $B_{(i-1)m+1}$, $A_{(i-1)m+2}$, $B_{(i-1)m+2}$, ..., $A_{im}$, $B_{im}$, are the input binary bits of the addends A and B of ith B-block. If the Isolated Carry Propagation Faster Adder which is connected in cascade has more than two levels, the ouput carry node $C_m$ of the rth B-block will be connected to the input carry node $C_0$ of the $(r+1)$th B-block which is the first B-block of the P-block next to the P-block 101 depicted in FIG. 29. For the case of a t level cascade connected Isolated Carry Propagation Fast Adder, the binary bits of the addends can be as large as $mr^{(t-1)}$ each.

FIGS. 25 and 27 are examples of a B-block and a P-block with delay numbers $d=1$. In general, the B-block and the P-block can be designed with a delay number d equal to any positive integer.

The speed of an adder can be represented by the number of gates or switches the signals have to pass through in the processing of an addition. In the processing of an addition in accordance with the present invention, the signals will, at most, pass through two logic gates and $d+1$ switches, where d is the delay number of the switch network. Two logic gates are, for example, AND gate 30 or NOR gate 32 in ith cell 20 in FIG. 2 and the second two input exclusive OR gate 34 in ith cell 20 in FIG. 2. The additional switch, in addition to d switches in the switch network 12 in FIG. 1, for example, is switch 36 or 38 in the ith cell of FIG. 2.

FIG. 21 is the schematic diagram of a T-R Model of a switch network with $n=16$, $d=2$. FIG. 22 is the completion of algorighm depicted in FIG. 13 corresponding to the T-R Model depicted schematically in FIG. 21. The speed and size of the adder with its switch network shown in FIG. 22 is as follows.

The speed is proportional to $\dfrac{1}{2 \text{ gate delays} + 3 \text{ switch delays}}$ which is equivalent to $\dfrac{1}{5 \text{ gate delays}}$ The size is equivalent to 98 logic gates which is calculated as follows: The adder base 11 includes, for this example, 16 cells. Each cell has three logic gates (see FIG. 6) except the first cell which has two logic gates (see FIG. 7). Since there are fifteen cells with three logic gates and one cell with two logic gates, the total number of logic gates in the adder base 11 is 47. There are 23 control gates in the switch network. As shown in FIG. 21, the switches which directly connect adjacent carry nodes that is, the switches in block 100 of FIG. 21, do not require control gates because each switch is controlled by one E signal as shown in FIG. 8. The rest of the switches shown in FIG. 21 (a total of 23) each require at least a two-input control AND gate because they do not connect adjacent carry nodes. Consequently, 23 control gates are required, resulting in a total of 70 gates (47+23) required for the adder of the present invention.

17 switches are required in the adder base 11 because each cell has one switches (see FIG. 6) except for the first cell which has two switches (see FIG. 7). Consequently, since there are sixteen cells in the present example, fifteen of which have one switches and one of which has two switches, a total of 17 switches are required in the adder base 11. 38 switches are required in the switch network as shown in FIG. 22. Consequently, a total of 55 switches (17+38) are required for the adder of the present invention in accordance with this example. Assuming that two switches are equivalent to one gate, a conservative assumption since each gate could have many more equivalent switches, the adder of the present invention, in accordance with this example, requires an equivalent of 98 logic gates (70+55/2~98).

Considering the speed and size conservatively, a signal passing a typical gate must pass through at least one switch and one resistive load or its equivalent. Therefore, a switch delay is shorter than a logic gate delay. Furthermore, a typical logic gate contains at least two or more switches. Therefore, one logic gate is physically equal to or larger than two switches in size.

Figure 30:
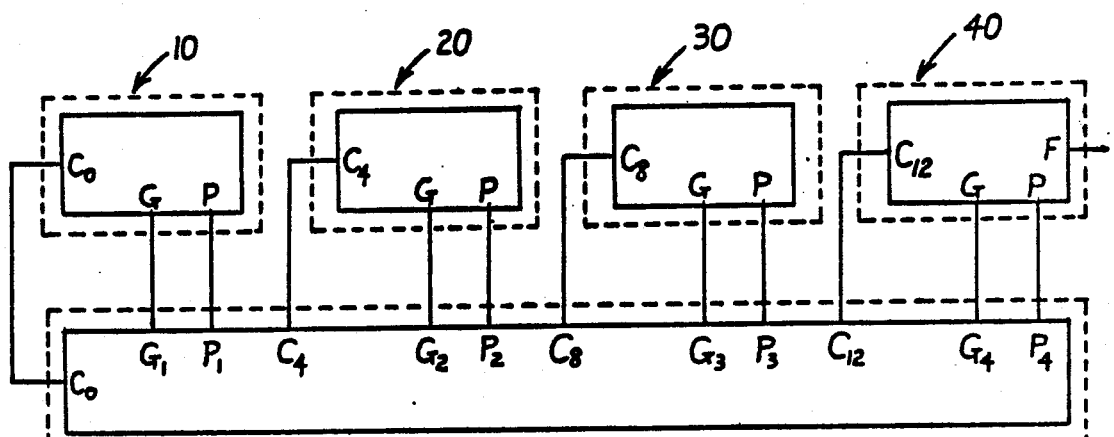
FIG. 30 is a block diagram of a typical prior art 16 bit look ahead fast carry adder.

A typical 16 bit look ahead adder, composed of five 4-bit integrated circuits, has approximately 130 logic gates and its speed is proportional to $$\dfrac{1}{8 \text{ gate delays}},$$

calculated as follows. FIG. 30 is a block diagram of a typical 16 bit look ahead fast carry adder. Blocks 10, 20, 30 and 40 are four identical 4 bit look ahead adders, each having about 30 digital logic gates. Block 100 is a 16 bit carry generator having about 12 digital logic gates. Consequently, the total number of digital logic gates in the 16 bit look ahead fast carry adder depicted in FIG. 30 is 132 or more. Bits 1 to 4 of the addends are the inputs to block 10. Bits 5 to 8 of the addends are the inputs to block 20. Bits 9 to 12 of the addends are the inputs to block 30. Bits 13 to 16 of the addends are the inputs to block 40. The signals of the inputs to blocks 10, 20, 30 and 40 must pass through 3 digital logic gates to reach the pairs of nodes $(G_1, P_1)$, $(G_2, P_2)$, $(G_3, P_3)$ and $(G_4, P_4)$ respectively in block 100. The signals of $(G_1, P_1)$, $(G_2, P_2)$, $(G_3, P_3)$ and $(G_4, P_4)$ must pass through 2 digital logic gates to reach the carry nodes $C_4$, $C_8$ and $C_{12}$, where $C_0$ is always 0. Carries $C_4$, $C_8$ and $C_{12}$ must pass through 3 digital logic gates to create the sum of the addends. Therefore, the process of adding two 16 bit digital numbers using typical look ahead adder must pass through $3+2+3=8$ gates.

$$\dfrac{\text{Speed of 16 bit adder of this invention}}{\text{Speed of typical 16 bit look ahead adder}} = \dfrac{1/5}{1/8} = \dfrac{8}{5} = 1.6$$

Consequently, the speed of the adder of the present invention is at least 60% faster than the speed of a prior art look ahead adder.

The ratio of the size is 130:98. It is 25% smaller than the prior art look ahead adder. The adder of this invention is faster and smaller. Another advantage of this invention is that all cells in the adder base can be the same; therefore, it is easy to make.

The above comparison of look ahead adder and Isolated Carry Propagation Fast Adder is according to the computation of total number of gates used and the total number of gate delay. It did not tell the reason why the Isolated Carry Propagation Fast Adder is faster and smaller than the look ahead adder.

Consider the four bits look ahead adder. There are four kinds of output carry of the four bits adder:

|        | $A_1$ | $B_1$ | $A_2$ | $B_2$ | $A_3$ | $B_3$ | $A_4$ | $B_4$ |
|--------|-------|-------|-------|-------|-------|-------|-------|-------|
| First  | 1     | 1     | 1     | 0     | 1     | 0     | 1     | 0     |
| Second |       |       | 1     | 1     | 1     | 0     | 1     | 0     |
| Third  |       |       |       |       | 1     | 1     | 1     | 0     |
| Fourth |       |       |       |       |       |       | 1     | 1     |

The four bits look ahead adder has four particular circuits to create each of these four kinds carry. Since these four particular circuits which create the output carry are electrically isolated, extra circuits are needed to select which circuit has the carry. More circuits means more logic gates. Extra circuits to select the carry means not only more logic gates but also more number of gate delay.

The adder of this invention has its carries propagation along universal C-sequence through the paths in switch network. Refer to the detailed description immediately follow the definitions 4, 5 and 6, in the processing of the addition of two binary digital numbers, a universal C-sequence W is electrically isolated from all carry nodes which are not in W. Each carry node $C_j$ which belongs to a maximum C-sequence is electrically isolated from all other nodes of the jth universal cell.

Definition 14: The capability of a universal C-sequence W of the adder of this invention can be electrically isolated from all carry nodes which are not in W in the processing of the addition of two binary digital numbers is called the Capability of Path Isolation.

Definition 15: The capability of each carry node $C_j$ which belongs to a maximum C-sequence of the adder of this invention can be electrically isolated from all other nodes of the jth universal cell in the processing of the addition of two binary digital numbers is called the Capability of Carry Node Isolation.

The capability of path Isolation and Carry Node Isolation are due to the configurations of the adder of this invention in which the input binary digital logic values of the addends A and B can control the switches in the switch network and the cells in the adder base in such a way that just satisfy the need of the Capabilities of Path Isolation and Carry Node Isolation as described in the previous detailed description.

Definition 16: The capability of the input binary digital logic values of the addends A and B to control the switches in the switch network in such a way that just satisfies the need of the Capability of Path Isolation; and to control the switches in each cell in such a way that just satisfies the need of the capability of Carry Node Isolation is called the Dynamic Isolation Property.

Definition 17: The capability of all the switches in the paths which connect any two carry nodes in the same universal C-sequence to be closed is called the Dynamic Connection Property.

The Dynamic Isolation Property and the Dynamic Connection Property make the adder of this invention using the paths in switch network 12 depicted in FIG. 1 more efficiently. Many kinds of carry propagation can share the switch network. For example, the path from the carry node $C_3$ to $C_{11}$ depicted in FIG. 17 is from $C_3$ to $C_4$ through switch 43; $C_4$ to $C_9$ through switch 60; $C_9$ to $C_{11}$ through switch 62. The path from the carry node $C_4$ to $C_{12}$ depicted in FIG. 17 is from $C_4$ to $C_9$ through switch 60; $C_9$ to $C_{11}$ through switch 62; $C_{11}$ to $C_{12}$ through switch 51. These two different paths can share the part from $C_4$ to $C_9$ through switch 60; $C_9$ to $C_{11}$ through switch 62.

The Capability of Path Isolation and the Capability of Carry Node Isolation can avoid the electric disaster, different digital logic values exist on the same node at the same time, without extra logic gates to select the carry. Therefore, the adder of this invention is not only using less number of logic gates but also faster.

Although the present invention has been described with reference to specific embodiments thereof, it will be obvious to those skilled in the art that various changes and modifications may be made without departing from the invention in its broader aspect. It is contemplated in the appended claims to cover all variations and modifications of the invention that come within the true spirit and scope of the invention. Therefore, it is intended that no limitations be placed on the invention except as defined by the scope of the appended claims.

I claim:

1. An apparatus for adding two binary numbers, each binary number having at least two binary digits, said digits increasing in significance from a least significant digit to a most significant digit, said apparatus comprising:
   (a) an adder base including a universal cell of a first type comprising a first double switch cell and at least one universal cell of a second type, each cell receives a binary digit of each of said binary numbers with said universal cell of said first type receiving said least significant digit and said at least one universal cell of said second type each receiving binary digits in increasing order of significance to and including said most significant digit, and each cell having an output carry node which is electrically connected to or isolated from the output carry node of another cell, which receives a more significant digit, based upon the value of the binary digits received by both said another cell and all cells which receives digit of decreasing significances down to, but not including, said each cell; and
   (b) a switch control for controlling a switch network whereby said switch network provides a path from any one carry node to any other carry node in accordance with dynamic connection and dynamic isolation properties.

2. The apparatus in accordance with claim 1 wherein said at least one universal cell of said second type comprises a double switch cell.

3. An apparatus for adding two binary numbers, each binary number having at least two binary digits, said digits increasing in significances from a least significant digit to a most significant digit, said apparatus comprising:
   (a) an adder base including a universal cell of a first type comprising a first resistor supported single switch cell and at least one universal cell of a second type, each cell receives a binary digit of each of said binary numbers, with said universal cell of said first type receiving said least significant digit and said at least one universal cell of said second type each receiving binary digits in increasing order of significance to and including said most significant digit, and each cell having an output carry node which is electrically connected to or isolated from the output carry node of another cell, which receives a more significant digit, based upon the value of the binary digits received by both said another cell and all cells which receive digits of decreasing significance down to, but not including, said each cell; and (b) a switch control for controlling a switch network whereby said switch network provides a path from any one carry node to any other carry node in accordance with dynamic connection and dynamic isolation properties.

4. The apparatus in accordance with claim 3 wherein said at least one universal cell of said second type comprises a resistor supported single switch cell.

5. An apparatus for adding two binary numbers, each binary number having at least two binary digits, said digits increasing in significances from a least significance digit to a most significant digit, said apparatus comprising:

(a) an adder base including a universal cell of a first type comprising a first single switch cell and at least one universal cell of a second type, each cell receives a binary digit of each of said binary numbers with said universal cell of said first type receiving said least significant digit and said at least one universal cell of said second type each receiving binary digits in increasing order of significance to and including said most significant digit, and each cell having an output carry node which is electrically connected to or isolated from the output carry node of another cell, which receives a more significant digit, based upon the value of the binary digits received by both said another cell and all cells which receive digits of decreasing significance down to, but not including, said each cell; and (b) a switch control for controlling a switch network whereby said switch network provides a path from any one carry node to any other carry node in accordance with dynamic connection and dynamic isolation properties.

6. The apparatus in accordance with claim 5 wherein said at least one universal cell of said second type comprises a single switch cell.

* * * * *